(12) United States Patent
Nakayama et al.

(10) Patent No.: US 8,761,165 B2
(45) Date of Patent: Jun. 24, 2014

(54) NETWORK SYSTEM

(75) Inventors: Kei Nakayama, Hamamatsu (JP); Ayumi Fukata, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 744 days.

(21) Appl. No.: 12/892,782

(22) Filed: Sep. 28, 2010

(65) Prior Publication Data

US 2011/0075849 A1 Mar. 31, 2011

(30) Foreign Application Priority Data

Sep. 29, 2009 (JP) ................................. 2009-223613

(51) Int. Cl.
*H04L 12/56* (2006.01)
*H04L 12/28* (2006.01)

(52) U.S. Cl.
USPC ........... 370/389; 370/230; 370/258; 370/404; 370/406

(58) Field of Classification Search
USPC ................................. 370/388, 389
See application file for complete search history.

(56) References Cited

U.S. PATENT DOCUMENTS

| 7,693,083 B2 * | 4/2010 | Nakayama .................... 370/249 |
| 2007/0223498 A1 * | 9/2007 | Nakayama et al. ........... 370/400 |
| 2007/0230462 A1 * | 10/2007 | Nakayama .................... 370/389 |
| 2008/0240459 A1 * | 10/2008 | Nakayama et al. ............. 381/77 |
| 2009/0100143 A1 | 4/2009 | Nakayama |

FOREIGN PATENT DOCUMENTS

| JP | 2007-258966 | 10/2007 |
| JP | 2007-259347 | 10/2007 |
| JP | 2009-094589 | 4/2009 |

* cited by examiner

*Primary Examiner* — Faruk Hamza
*Assistant Examiner* — Abu-Sayeed Haque
(74) *Attorney, Agent, or Firm* — Morrison & Foerster LLP

(57) ABSTRACT

A connecting node in a first sub-network system reserves a transmission channel in a connecting network, reads waveform data having a designated signal name from a TL frame in the first sub-network system, and writes the read waveform data into the reserved transmission channel in a TL frame in the connecting network, and a connecting node in a second sub-network system reserves a transmission channel in the second sub-network system, reads the waveform data having the designated signal name from the TL frame in the connecting network, and writes the read waveform data into the reserved transmission channel in a TL frame in the second sub-network system.

12 Claims, 17 Drawing Sheets

FIG. 17

| INPUT PORT / OUTPUT CHANNEL ID | SIGNAL NAME |
|---|---|
| IP1 | SN1 |
| IP2 | SN2 |
| IP3 | SN3 |
| ⋮ | ⋮ |
| IPni | SNni |

FIG. 18

| ID | SUPPLY SOURCE | SIGNAL NAME | SUPPLY DESTINATION | IMPLEMENTATION |
|---|---|---|---|---|
| 1 | SS(1) | SN(1) | SD(1) | OK |
| 2 | SS(2) | SN(2) | SD(2) | OK |
| 3 | SS(3) | SN(3) | SD(3) | OK |
| ⋮ | ⋮ | ⋮ | ⋮ | ⋮ |
| nr | SS(nr) | SN(nr) | SD(nr) | NG |

FIG. 22

| SIGNAL TRANSMISSION CHANNEL ID | SIGNAL NAME |
|---|---|
| IC1 | SNS1 |
| IC2 | SNS2 |
| IC3 | SNS3 |
| ⋮ | ⋮ |
| ICnc | SNSnc |

FIG. 23

START
(DETECT REMOTE CONTROL OPERATION)

S141
IDENTIFY TARGET DEVICE OF REMOTE CONTROL TARGET RELATING TO DETECTED OPERATION

S142
UPDATE CURRENT MEMORY IN CONTROLLER ACCORDING TO DETECTED CONTROL OPERATION

S143
GENERATE CONTROL OPERATION NOTIFICATION INCLUDING INFORMATION OF DETECTED CONTROL OPERATION AND NETWORK ID OF SUB-NETWORK SYSTEM THAT IS SET AS CONTROL TARGET AT PRESENT AND ADDRESSED TO TARGET DEVICE IDENTIFIED IN STEP S141, AND TRANSMIT GENERATED NOTIFICATION BY WRITING THAT INTO TL FRAME IN SUB-NETWORK

S144
DETERMINE OR CANCEL UPDATE OF CURRENT MEMORY IN STEP S142 ACCORDING TO RESPONSE TO CONTROL OPERATION NOTIFICATION

END

NETWORK SYSTEM

BACKGROUND OF THE INVENTION

1. Field of the Invention

The invention relates to a network system for transporting audio signals among a plurality of nodes.

2. Description of the Related Art

Recently, proposed network systems configured to be able to transport audio signals in real time among a plurality of devices include, for example, those described in the following Documents 1 and 2.

In the network systems described in the Documents 1 and 2, a frame is periodically circulated along a ring transmission route formed by processors constituting the system and each of the processors reads necessary data from the frame and writes necessary data into the frame, whereby not only the audio signals but also control signals such as the Ethernet (registered trademark) frame and the like can be stably transported from any processor to any processor both of which constitute the system. The processors are connected to form a loop and then operate in a suitable mode, whereby when a communication failure occurs at one location in the network, the network can continue the transport of the audio signals and the control signals in a substantially similar manner to that before the occurrence of the communication failure and provide stable data transport in this point of view.

Aside from these systems, the network system as described in the Document 3 is also proposed.

The network system described in the Document 3 is configured such that a plurality of sub-networks are connected to one another via a connecting network to enable routings of signals from a processor belonging to one sub-network to a processor belonging to another sub-network. The routing enables the processor belonging to the one sub-network to utilize the function of the processor belonging to the another sub-network, so that even when the number of processors connectable to the one sub-network is limited depending on the maximum number of transmission channels for the audio signals determined from the standard of the network, each processor can utilize the functions of the processors exceeding the limit in the maximum number of transmission channels.

Document 1: Japanese Patent Laid-open Publication No. 2009-94589

Document 2: Japanese Patent Laid-open Publication No. 2007-259347

Document 3: Japanese Patent Laid-open Publication No. 2007-258966

SUMMARY OF THE INVENTION

Incidentally, in the network systems described in the above-described Documents 1 and 2, it is necessary to circulate a frame for signal transmission along the transmission route in a predetermined period while each of the processors reads data from the frame and writes data into the frame.

Accordingly, those network systems have a problem of limits in the number of processors which can be installed in the system and in the physical length of the transmission route (depending mainly on the length of the cable connecting the processors).

Further, there is a demand to keep the reliability in communication even in the case where the transmission route is elongated or the number of connected processors is increased to accordingly increase the probability of occurrence of failure.

On the other hand, the case where a plurality of network systems described in the above-described Documents 1 and 2 are connected so that audio signals can be transmitted and received among processors belonging to different systems (forming different transmission routes) has a problem that complicated setting is required to determine a suitable signal transmission route among many processors belonging to the systems. Another problem is that the operation performed by each processor is also complicated.

In the network system described in the Document 3, the node in the network can automatically reserve necessary transmission channels depending on the setting of patch and form a signal transmission route according to the patch, but the simplicity of control in each processor is far from adequate.

The invention has been made under the above-described background, and an object thereof is to realize, in the case where a plurality of networks each periodically circulating a frame along a ring transmission route to convey audio signals are connected, the audio signal transport across the networks by a simple operation and control.

In order to achieve the above-described object, network system of the invention is a network system including a first sub-network system and a second sub-network system respectively including a plurality of nodes connected one another in a cascade style or in a loop style to constitute a sub-network conveying a plurality of audio signals among the plurality of nodes, a first connecting node in the first sub-network system and a second connecting node in the second sub-network system are connected each other to constitute a connecting network conveying a plurality of audio signals, using a plurality of transmission channels, among the first connecting node and the second connecting node, the network system further including: a first controller that controls transmission of the audio signals in the first sub-network system; and a second controller that controls transmission of the audio signals in the second sub-network system, wherein the network system initiates a forwarding operation of an audio signal conveyed by the sub-network in the first sub-network system to the sub-network in the second sub-network system through following steps a) to d): a) the first controller selects one or more audio signals among audio signals which the first connecting node can receive via the sub-network in the first sub-network system and sets, to the first connecting node, one or more signal names identifying the selected audio signals; b) based on the signal names set to the first connecting node in the step a), the first connecting node reserves one or more transmission channels among the plurality of transmission channels of the connecting network, sends the audio signals identified by the signal names via the connecting network using the reserved transmission channels, and notifies, to the second connecting node and the second controller, the signal names related with the reserved transmission channels; c) the second controller selects an audio signal among the audio signals identified by the signal names, notified by the first connecting node in the step b), and sets, to the second connecting node, the signal name identifying the selected audio signal; and d) based on the signal name set to the second connecting node in the step c), the second connecting node receives the audio signal in the transmission channel related with the signal name via the connecting network, and sends the received audio signal via the sub-network in the second sub-network system.

In the above network system, it is conceivable that each of the first and second sub-network systems has its network ID, wherein, in the step b), the first connecting node notifies, to the second connecting node, the network ID of the first subnetwork system in addition to the signal names related with the reserved transmission channels, wherein, in the step c), the second controller selects an audio signal among the audio signals identified by the network ID and the signal names notified to the second connecting node in the step b), and sets, to the second connecting node, the network ID and the signal name identifying the selected audio signal, and wherein, in the step d), based on the network ID and the signal name set to the second connecting node in the step c), the second connecting node receives the audio signal in the transmission channel related with the network ID and the signal name via the connecting network.

Alternatively, it is conceivable that a ring transmission route running through the first connecting node and the second connecting node is formed for the connecting network and a frame having the plurality of transmission channels is periodically circulating along the ring transmission route, one of the first and second connecting nodes transmits an audio signal by writing the audio signal into one transmission channel in the frame and the other of the first and second connecting nodes receives the audio signal by reading the audio signal from the transmission channel in the frame.

Another network system of the invention is a network system including a first sub-network system and a second sub-network system respectively including a plurality of nodes connected one another in a cascade style or in a loop style to constitute a sub-network conveying a plurality of audio signals, using a plurality of transmission channels, among the plurality of nodes, a first connecting node in the first sub-network system and a second connecting node in the second sub-network system are connected each other to constitute a connecting network conveying a plurality of audio signals, using a plurality of transmission channels, among the first connecting node and the second connecting node, the network system further including: a first controller that controls transmission of the audio signals in the first sub-network system; and a second controller that controls transmission of the audio signals in the second sub-network system, wherein each node in the first sub-network system reserves one or more transmission channels of the sub-network in the first sub-network system, transmits one or more audio signals in the node via the sub-network in the first sub-network system using the reserved transmission channels, and notifies one or more signal names identifying the transmitted audio signals and related with the reserved transmission channels to each of the nodes in the first sub-network system and the first controller, and wherein the audio network system initiates forwarding operation of an audio signal conveyed by the sub-network in the first sub-network system to the sub-network in the second sub-network system through following steps a) to f): a) the first controller selects one or more audio signals among audio signals identified by signal names notified by any node in the first sub-network system and sets, to the first connecting node, one or more signal names identifying the selected audio signals; b) based on the signal names set to the first connecting node in the step a), the first connecting node receives one or more audio signals in one or more transmission channels related with the signal names via the sub-network in the first sub-network system; c) the first connecting node reserves one or more transmission channels of the connecting network, sends the audio signals received in the step b) via the connecting network using the reserved transmission channels, and notifies, to the second connecting node and the second controller, the signal names set to the first connecting node in the step a) related with the reserved transmission channels; d) the second controller selects an audio signal among the audio signals identified by the signal names, notified by the first connecting node in the step c), and sets, to the second connecting node, the signal name identifying the selected audio signal; e) based on the signal name set to the second connecting node in the step d), the second connecting node receives the audio signal in the transmission channel related with the signal name via the connecting network; and f) the second connecting node reserves a transmission channel of the sub-network in the second sub-network system, sends the audio signal received in the step e) via the sub-network in the second sub-network system using the reserved transmission channel, and notifies the signal name set to the second connecting node in the step d) and related with the reserved transmission channel to each of the nodes in the second sub-network system and the second controller.

In the above network systems, it is conceivable that each of the first and second sub-network systems has its network ID, wherein, in the step c), the first connecting node notifies, to the second connecting node and the second controller, the network ID of the first sub-network system in addition to the signal names related with the reserved transmission channels, wherein, in the step d), the second controller selects an audio signal among the audio signals identified by the network ID and the signal names notified by the first connecting node in the step c), and sets, to the second connecting node, the network ID and the signal name identifying the selected audio signal, and wherein, in the step e), based on the network ID and the signal name set to the second connecting node in the step d), the second connecting node receives the audio signal in the transmission channel related with the network ID and the signal name via the connecting network.

Alternatively, it is conceivable that, in each of the first and second sub-network systems, a ring transmission route running through all of the plurality of nodes is formed, and a frame having a plurality of transmission channels is periodically circulating along the ring transmission route, the sub-network conveys an audio signal from one node to an other node in such a way that the one node transmits an audio signal via the sub-network by writing the audio signal into one transmission channel in the circulating frame and the other node receives the audio signal via the sub-network by reading the audio signal from the transmission channel in the circulating frame.

Further, it is also conceivable that the audio network system initiates a receiving operation of an audio signal via the sub-network by one node in the second sub-network system through following steps g) to h): g) the second controller selects an audio signals among audio signal identified by signal names notified by any node in the second sub-network system and sets, to the one node, a signal name identifying the selected audio signal; and h) based on the signal names set to the one node in the step g), the one node receives an audio signal in a transmission channel related with the signal name via the sub-network in the second sub-network system.

Alternatively, it is also conceivable that the audio network system initiates a receiving operation of an audio signal via the sub-network by one node in the first sub-network system through following steps g) to h): g) the first controller selects an audio signal among audio signals identified by signal names notified by any node in the first sub-network system and sets, to the one node, a signal name identifying the selected audio signal; and h) based on the signal names set to the one node in the step g), the one node receives an audio signal in a transmission channel related with the signal name via the sub-network in the first sub-network system.

Furthermore, it is also conceivable that the audio network system initiates a transmitting operation of an audio signal via the sub-network by one node in the first sub-network system through following steps i) to k): i) the first controller gives a signal name to each of audio signals input to the one node or processed in the one node and notifies the signal names of the audio signals to the one node; j) the first controller selects an audio signals among the audio signals in the one node and commands the one node to send the selected audio signals; and k) based on the command in the step j), the one node reserves a transmission channel of the sub-network in the first sub-network system, sends the audio signal selected in the step j) via the sub-network in the first sub-network system using the reserved transmission channel, and notifies the signal name of the selected audio signal related with the reserved transmission channel to each of the nodes in the first sub-network system and the first controller.

Alternatively, it is also conceivable that the audio network system initiates a transmitting operation of an audio signal via the sub-network by one node in the second sub-network system through following steps i) to k): i) the second controller gives a signal name to each of audio signals input to the one node or processed in the one node and notifies the signal names of the audio signals to the one node; j) the second controller selects an audio signal among the audio signals in the one node and commands the one node to send the selected audio signals; and k) based on the command in the step j), the one node reserves a transmission channel of the sub-network in the second sub-network system, sends the audio signal selected in the step j) via the sub-network in the second sub-network system using the reserved transmission channel, and notifies the signal name of the selected audio signal related with the reserved transmission channel to each of the nodes in the second sub-network system and the second controller.

The above and other objects, features and advantages of the invention will be apparent from the following detailed description which is to be read in conjunction with the accompanying drawings.

BRIEF DESCRIPTION OF THE DRAWINGS

FIG. 17 is an illustration showing an example of the signal name setting table stored in each of the devices constituting the audio network system;

FIG. 18 is an illustration showing an example of the routing table stored in each of the devices;

FIG. 22 is an illustration showing an example of the channel table stored in each of the devices constituting the audio network system;

FIG. 23 is the flowchart of process executed by the controller when detecting the remote control operation.

DETAILED DESCRIPTION OF THE PREFERRED EMBODIMENTS

Hereinafter, an embodiment to embody the invention will be concretely described based on the drawings.

1. Outline of Audio Network System of Embodiment of the Invention 1.1 Entire Configuration FIG. 1 shows the schematic configuration of an audio network system that is an embodiment of a network system of the invention.

Figure 1:
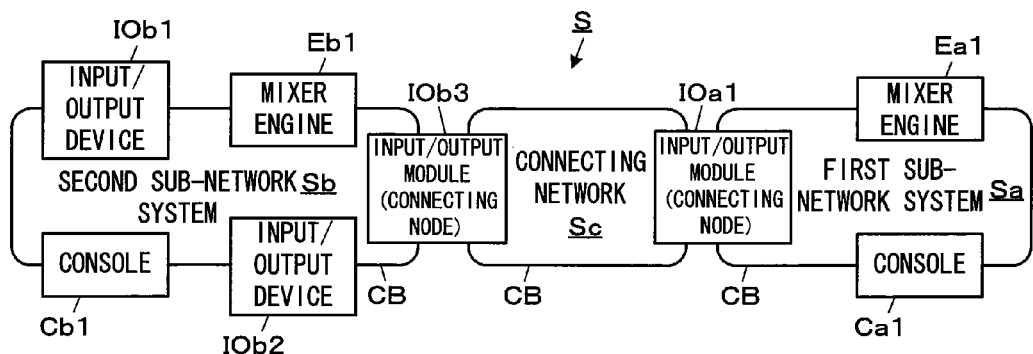
FIG. 1 is a diagram showing the schematic configuration of an audio network system that is an embodiment of a network system of the invention.

As shown in FIG. 1, the audio network system S is configured such that a first sub-network system Sa and a second sub-network system Sb are connected by a connecting network Sc.

The first sub-network system Sa includes a console Ca1, a mixer engine Ea1, and an input/output device (processor) IOa1 which are connected one another in a loop style via communication cables CB. Alternatively, the devices Ca1, Ea1, and IOa1 may be connected in a cascade style having ends while omitting the connection at any one location. This also applies to the other sub-network system and the connecting network.

The second sub-network system Sb includes a console Cb1, an input/output device IOb1, a mixer engine Eb1, an input/output device IOb3, and an input/output device IOb2, which are connected one another in a loop style via communication cables CB.

Among the devices constituting each sub-network system, each of the input/output device IOa1 and the input/output device IOb3 separately has a network I/F (interface) for connecting to the sub-network system Sa or Sb and a network I/F for connecting to the connecting network.

In each of the sub-network systems, the input/output device IOa1 or the input/output device IOb3 can transmit and receive, as a node belonging to that sub-network system, data to/from other nodes belonging to that sub-network system and transmit data inputted to one of the sub-network systems to the connecting network and transmit data of the other sub-network system which has been transmitted via the connecting network, to the sub-network system which the input/output device IOa1 or the input/output device IOb3 belongs to. Thus, the input/output device IOa1 or the input/output device IOb3 can work as a connecting node connecting the sub-network system with the connecting network.

That means, the input/output device IOa1 which is a connecting node in the first sub-network system Sa and the input/output device IOb3 which is a connecting node in the second sub-network system Sb are connected each other to constitute a connecting network Sc which connects the first sub-network system Sa and the second sub-network system Sb.

The input/output devices IOa1 and IOb1 to IOb3 each have an input unit inputting audio signals from the outside into the audio network system S and/or an output unit outputting audio signals to the outside. For performing analog input/output, the input/output devices IOa1, IOb1 to IOb3 each include an A/D converter and a D/A converter and perform conversion between digital audio signals handled in the audio network system S and analog audio signals inputted/outputted through its terminals. The number of input channels (input ports) and output channels (output ports) and other functions provided in the input/output device may be different device by device.

The consoles Ca1 and Cb1 are devices for accepting operations to devices constituting the audio network system S, and has a console panel including many controls and a display device.

The mixer engines Ea1 and Eb1 are devices performing various kinds of signal processing such as mixing, equalizing, effect addition and the like on audio signals in a plurality of channels inputted from each input/output device and transported through the audio network system S. The result of the signal processing can be transported to each input/output device via the audio network system S and outputted from the input/output device to the outside.

1.2 Configuration of Sub-Network System

Figure 2A:
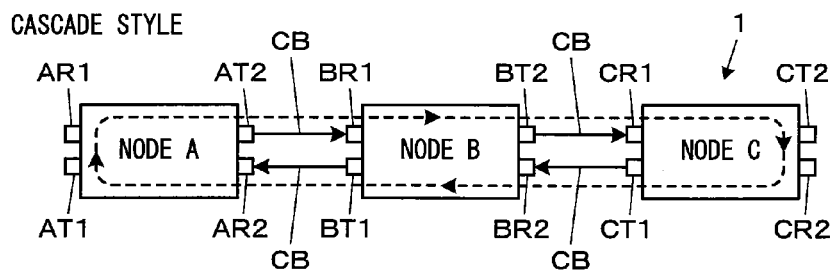
FIG. 2A and FIG. 2B are diagrams showing the schematic configurations of a sub-network system to constitute a sub-network (and a connecting network) of the audio network system shown in FIG. 1.
Figure 2B:
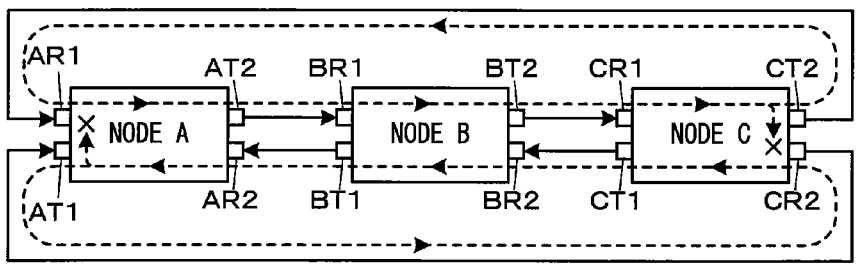

Next, FIG. 2A and FIG. 2B show the schematic configurations of a sub-network system to constitute a sub-network. Note that the configuration and the method of frame transport are the same in the connecting network.

As shown in FIG. 2A and FIG. 2B, the sub-network system 1 is constructed by connecting nodes by communication cables CB in sequence, each of the nodes including two sets of reception interfaces (I/Fs) being receivers and transmission I/Fs being transmitters each of which performs communication in a singe direction. These nodes correspond to the consoles Ca1 and Cb1, the input/output devices IOa1 and IOb1 to IOb3, and the mixer engines Ea1 and Eb1 in FIG. 1. Although an example composed of three nodes A to C is shown, any number of nodes more than one may be employed.

In the node A, a reception I/F AR1 and a transmission I/F AT1 are one set of I/Fs, and a reception I/F AR2 and a transmission I/F AT2 are another set of I/Fs. For the nodes B and C, the same relation also applies to I/Fs with a first character of symbol "B" or "C" in place of "A."

The connection between the nodes is established by connecting one set of reception I/F and transmission I/F to one set of transmission I/F and reception I/F of another node via the communication cables CB, respectively. For example, between the node A and the node B, the reception I/F AR2 is connected with the transmission I/F BT1, and the transmission I/F AT2 is connected with the reception I/F BR1. Further, between the node B and the node C, another set of I/Fs in the node B are connected with one set of I/Fs in the node C.

The state in which the nodes are connected as one line having ends as shown in FIG. 2A shall be called "cascade style". In this case, the cables CB connecting between the nodes can be used to form one ring data transmission route as shown by a broken line, so that the connected plurality of nodes constitute a sub-network conveying a plurality of audio signals among the plurality of nodes, that is, the plurality of nodes transmit and receive data to/from any node on the transmission route by transmitting a frame over the transmission route in a manner to circulate it in a constant period, and reading and writing necessary information from/into the frame.

In the sub-network in the sub-network system 1, one node becomes a master (such a master per sub-network or connecting network shall be called a "sub-network master"), which generates a frame for transporting audio signals, periodically circulates the frame over the transmission route, and manages the sub-network (or the connecting network). The frame generated by the sub-network master shall be called a "TL (Transporting Lorry) frame."

Accordingly, a sub-network conveying audio signals written in the TL frame among a plurality of nodes can be constituted in the sub-network system. Hereinafter, a sub-network constituted in the first sub-network system Sa shall be called a "first sub-network", and a sub-network constituted in the second sub-network system Sb is called a "second sub-network".

By connecting I/Fs which are not used in the nodes at both ends by using communication cables CB in addition to the cascade shown at FIG. 2A, two ring data transmission routes can be formed as shown in FIG. 2B. Each of the nodes can perform transmission of data to any node on the routes and reception of data from any node on the routes by transporting frames over the routes respectively, and reading and writing necessary information from/into each of the frames. The connection status among the nodes shall be called a "loop style."

In the case where communication is performed at a data amount transportable only by one of the TL frames among two TL frames circulated along the two transmission routes in the loop style, even if a break of wire occurs at one location, the transport of the TL frame is looped back at both sides of the break location, whereby the sub-network system can be immediately reconstructed into the system in the cascade as shown in FIG. 2A with both sides of the break location regarded as both ends of the cascade to continue the transport of the TL frame with a loss of zero to two frames at most (see Japanese Patent Laid-open Publication No. 2007-259347).

Further, although two cables are shown in FIG. 2A and FIG. 2B, one cable which is made by bundling the two cables together can also be used to establish connection between one set of I/Fs, as long as the reception I/F and transmission I/F in one set are adjacently or integrally provided.

As in the input/output device IOa1 and IOb3 in FIG. 1, the device connected to two or more networks (the sub-network system and the connecting network) has two sets of transmission/reception I/Fs for every network connected therewith, used in the connected network. Therefore, each of the input/output devices IOa1 and IOb3 has four sets of transmission/reception I/Fs.

Further, when each node is provided with a necessary IN, an external device can be connected thereto so that the node can write data received from the external device into the TL frame and transmit the TL frame to another node and transmit the data read out from the TL frame to the external device.

As such an external device, for example, an external console is conceivable. It is also conceivable that the console transmits a command in accordance with an operation accepted from a user, to a node connected thereto, thereby causing operations such that the node writes the command into the TL frame and transmits it to another node, or the node connected to the console reads out a response, level data or the like which has been written into the TL frame and transmitted by the another node, and transmits it to the console, so as to use it for display of the state of a control or level display in the console.

1.3 Configuration of TL Frame

Figure 3:
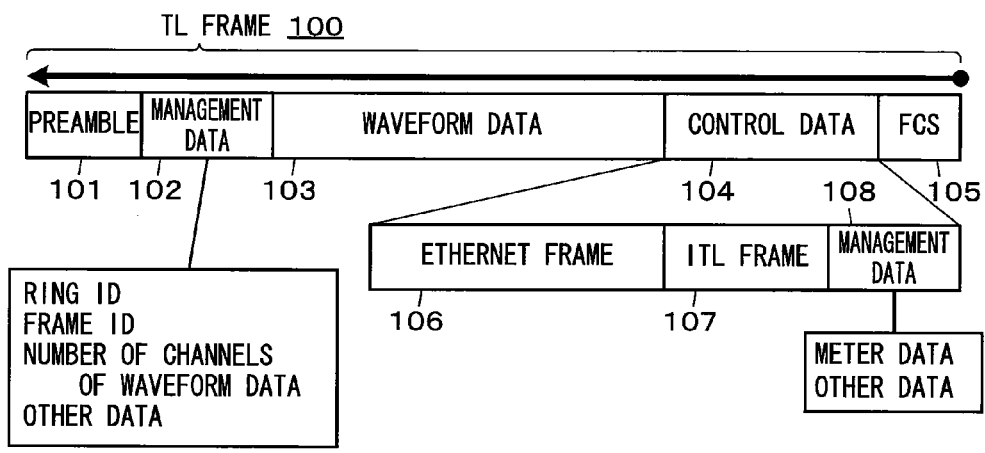
FIG. 3 is an illustration showing a configuration example of a TL frame transported along transmission routes in the network shown in FIG. 2A and FIG. 2B.
Figure 4:
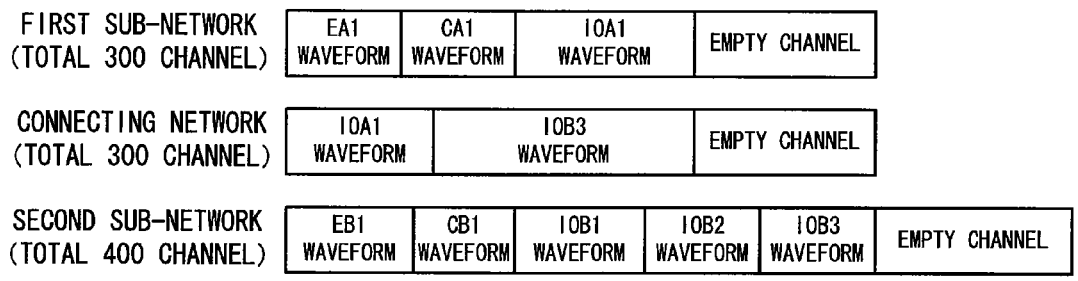
FIG. 4 is an illustration showing more detailed configurations of a waveform data region of the TL frame shown in FIG. 3.

Next, a configuration example of the TL frame that is transported through the above-described transmission routes in the sub-network in the sub-network system and the connecting network is shown in FIG. 3. FIG. 4 shows more detailed configurations of a waveform data region of the TL frame. Note that the widths of the regions shown in these drawings do not necessarily correspond to data sizes.

As shown in FIG. 3, the TL frame 100 is composed of regions such as a preamble 101, management data 102, waveform data (audio data) region 103, control data region 104, and FCS (Frame Check Sequence) 105 in sequence from the head. The size of each region is fixed irrespective of the data amount to be written in the region.

In the preamble 101, preamble defined by IEEE (Institute of Electrical and Electronic Engineers) 802.3 and SFD (Start Frame Delimiter) are written.

In the management data 102, a ring ID indicating the transmission route in the sub-network system through which the frame circulates, a frame ID that is a frame serial number, the number of channels of the waveform data in the waveform data region 103, and so on are written as the data to be used in management of data written in the TL frame by each of the nodes in the sub-network system 1.

The waveform data region 103 is a region in which data of audio signals is written, and waveform data of 16 bits for 1 sample can be written for 400 channels as data of audio signals. In this case, in a sub-network, the audio signals corresponding to the 400 channels can be conveyed by circulating one TL frame 100. Note that it is not necessary to concern about what is written in regions of channels not in use for transmission (empty channels) in the 400 channels.

The amount of waveform data conveyable in each sub-network in the sub-network system is determined according to the size of the TL frame that the sub-network master transmits in each sampling period. As the transport rate in the sub-network is higher, a TL frame with a larger size can be transported, and the size of the waveform data region in the TL frame can be larger. The number of channels for the conveyable waveform data can be found as a quotient obtained by dividing the size of the waveform data storage region by the size required for conveying the waveform data per channel.

For example, the size of the waveform data region may be 800 bytes for conveying the waveform data of 1 to 16 bits for 400 channels, whereas the size of the waveform data region needs to be 1600 bytes for conveying the waveform data of 17 to 32 bits for the same 400 channels. Further, when the waveform data of 16 bits only for 300 channels needs to be conveyed, it is only necessary to prepare the waveform data region of 600 bytes.

The channel for conveying the waveform data prepared in the waveform data region 103 is hereinafter called a "transmission channel".

In the audio network system S, the sub-network master in each of the sub-networks and the connecting network allocates, according to a request from each node belonging to the network, transmission channels in the waveform data region 103 to each node as shown in FIG. 4, and each node writes output waveform data at positions of the transmission channels allocated to the node.

In the audio network system S, the allocation of the transmission channels can be performed individually and independently for the sub-networks and the connecting network. Also to the node belonging to a plurality of networks, transmission channels used in each of the networks are allocated on a network basis.

In the example in FIG. 4, transmission channels are allocated to the input/output device IOa1 both in the first sub-network and the connecting network, and transmission channels are allocated to the input/output device IOb3 both in the second sub-network and the connecting network.

Accordingly, the number of allocatable channels may be different in different networks. However, the waveform data size per sample is preferable in common in all of the networks.

Returning to the explanation of FIG. 3, in the control data region 104, an Ethernet frame region 106, an ITL frame region 107, and a management data region 108 are provided.

In the Ethernet frame region 106 among the regions, a frame in the IEEE (Institute of Electrical and Electronic Engineers) 802.3 format (an Ethernet frame) that is obtained by framing the IP packet for inter-node communication based on the IP (Internet Protocol) is written.

If the Ethernet frame to be written exceeds the prepared size, the Ethernet frame is divided into a necessary number of blocks on the transmission side device, and each of the blocks is written into one TL frame. Then the above described necessary number of TL frames are transported to the destination, and the destination device reads out respective blocks from the respective TL frames 100 and combines the blocks together to restore the Ethernet frame before division, whereby the Ethernet frame can be transported between the nodes in a similar manner to the regular transport based on the Ethernet (registered trademark).

In the ITL frame region 107, data of an ITL frame to be used for transport of a command and a response to the command between adjacent nodes is written. This ITL frame is used for data transfer when forming the frame transmission route of the sub-network and the connecting network and data transfer after the network is formed though detailed explanation is omitted.

The management data region 108 is a region into which data that is used for management of data contained in the TL frame 100 by each of the nodes in the sub-networks and the connecting network is written. The data to be written into the management data region 108 include, for example, level data of audio signals that is used for displaying a level, a break detection flag indicating that the TL frame 100 has been broken during transport, an error flag indicating that an error has occurred during transport of the TL frame 100, and so on.

The FCS 105 is a field for detecting an error of the frame, defined by IEEE 802.3.

1.4 Method of Transmitting TL Frame

Figure 5:
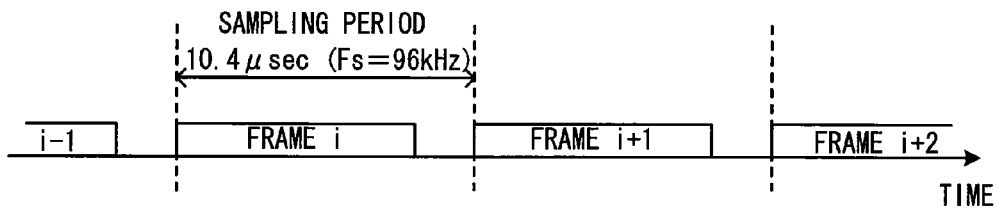
FIG. 5 is a chart showing a transport timing of the TL frame.

Next, a transport timing of the TL frame 100 shown in FIG. 3 is shown in FIG. 5.

As shown in this drawing, in the sub-network constituted in the sub-network system 1, one TL frame 100 is circulated among the nodes every 10.4 μsec (microseconds) that is one period of a sampling period of 96 kHz, and each node writes the audio signals into a desired channel of the TL frame or reads the audio signals from a desired channel. Accordingly, one sample of the waveform data can be transported between the nodes for transmission channels provided in the waveform data region 103 in each sampling period.

When data transfer in the Ethernet (registered trademark) system of 1 Gbps (gigabit per second) is employed, (assuming that the size of the TL frame is, for example, 1282 bites,) the time length of the TL frame 100 is 1 nanosecond×8 bits×1282 bytes=10.26 μsec, so that the transmission of the TL frame 100 from the master node is completed in one sampling period. If the data transfer speed and the sampling period are different, the size of the TL frame transportable in one sampling period will accordingly differ.

Figure 6:
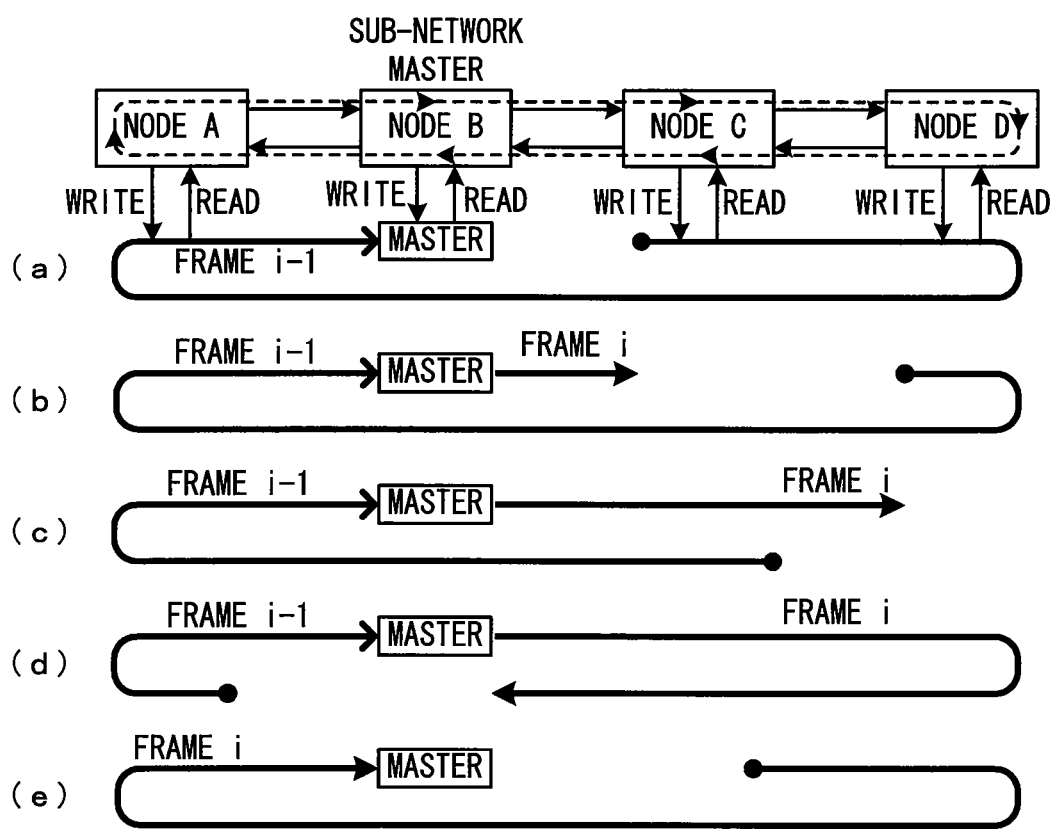
FIG. 6 is an illustration for explaining the transport statuses of the TL frame during transport of audio signals on the sub-network and the connecting network.

Next, states of the TL frame shown in FIG. 3 during transport of the audio signals on the sub-network and the connecting network are shown in FIG. 6.

A sub-network constituted in a sub-network system in which four nodes, the node A to the node D, are cascaded is discussed here. When the TL frame 100 is circulated through the nodes in the sub-network, any one of the nodes is determined as a sub-network master, and only that node generates the TL frame in a new sampling period (a TL frame with a different serial number) and transmits the TL frame generated in each sampling period to the next node. The nodes other than the sub-network master are slave nodes which perform transfer process of receiving the TL frame from their respective preceding nodes and transmitting it to the respective next nodes.

When the sub-network master B first transmits the TL frame, rightward in the drawing, toward the node C in accordance with the timing of a wordclock, the TL frame is transported to the nodes B, C, D, C, B, A, and B in order as shown by the broken line and thus returned to the node B. While the TL frame circulates through the transmission route, each node reads, from the TL frame, the waveform data and the control data which the node should receive from another node, and writes, into the TL frame, the waveform data and the control data which the node should transmit to the other node, during the time period that the TL frame is flashing through the node, namely from reception to transmission of each portion of the TL frame in the node.

When the TL frame returns after circulating through the transmission route, the sub-network master overwrites the management data in the TL frame to generate the TL frame in the later sampling period, and provides it to transmission in an appropriate sampling period. In this event, the sub-network master also r reads and writes data from/into the TL frame as with the other nodes.

By repeating the above, one TL frame can be circulated for one sampling period, among the nodes as shown in (a) to (e) in time sequence. In these drawings, a black arrow shows the head of the TL frame, a black circle shows the end of the TL frame, and a bold line connected to the black arrow and/or the black circle shows the TL frame itself. The arrow of a line connected to the bold line is indicating the return of the TL frame to the sub-network master after circulating through the transmission route.

Note that each slave node receiving the TL frame, before the node completes receiving all the TL frame (from the head to the tail), starts to read and write data from/into the TL frame from the head, and further starts to transmit the TL frame from the head to the next node at a timing when the node has received necessary bytes of the TL frame from the head. Thereafter, the slave node performs the reading and writing of data and transmits the TL frame to the end at substantially the same speed as the node receives the TL frame. On the other hand, the sub-network master receives the entire TL frame and then generates a new TL frame based on the contents of the received frame in order to confirm that the TL frame has been normally circulated through the transmission route.

In the cascade style, the TL frame flashes through each of the nodes other than nodes at both ends in the sub-network system twice in one circulation, but the node reads and writes data other than the data of the ITL frame region 107 from/to the TL frame on only one occasion of them. On which occasion the node reads and writes audio data is selectable. In one case, the node reads and writes audio data at the first time when the frame flashes through the node. In another case, the node reads and writes audio data at the time when the frame flashes through the node rightward in the drawing. When the node does not read and write audio data from/to the TL frame, the node overwrites only the transmission source address and transmits the frame to the next node. Regarding an ITL frame, it is preferable that the ITL frame can be transmitted to adjacent nodes in both directions.

Since each node needs to perform buffering at the time of receiving the TL frame, in order to overwrite the data of the TL frame or to absorb the difference in frequency and timing between the network clock on the receiving side (corresponding to the operation clock of the transmission source node) and the network clock on the transmitting side (corresponding to the operation clock of that node), there is a time lag between the timing when the node starts to receive a TL frame and the timing when the node starts to transmit the received frame.

The transport delay of the audio signals transported over the network is in the unit of sampling period and is minimal in a condition that the TL frame transmitted by the sub-network master at a timing of a wordclock in S-th period returns to the sub-network master, after circulating through the transmission route, at a timing earlier than a wordclock in (S+2)-th period by a predetermined time a (corresponding to a time necessary to generate a new TL frame in (S+2)-th period based on the received frame in S-th period).

In this network, by performing data transport in the above-described method, a fixed transport bandwidth according to the size of the TL frame in the network can be secured at all times, as long as the TL frame can circulate through all of the nodes in the system within the limit. The bandwidth is not affected by the magnitude of the data transport amount between specific nodes.

In the case where two transmission routes are formed in the sub-network constituted in the sub-network system in the loop style, as is clear from FIG. 2B, in one transmission route, a TL frame generated and transmitted rightward by the sub-network master B is transported from the node B to the nodes C, D, A, and B in order, and in the other transmission route, a TL frame generated and transmitted leftward by the sub-network master B is transported from the node B to the nodes A, D, C, and B in order. In this case, the TL frame flashes through each of the nodes in the sub-network once in one circulation along the transmission route, and the node reads data from the TL frame and writes data into the TL frame during the one flash.

1.5 Hardware Configuration and Basic Operation of Devices Constituting System

Next, the hardware for transporting the TL frame as has been described above and its operation will be described.

Figure 7:
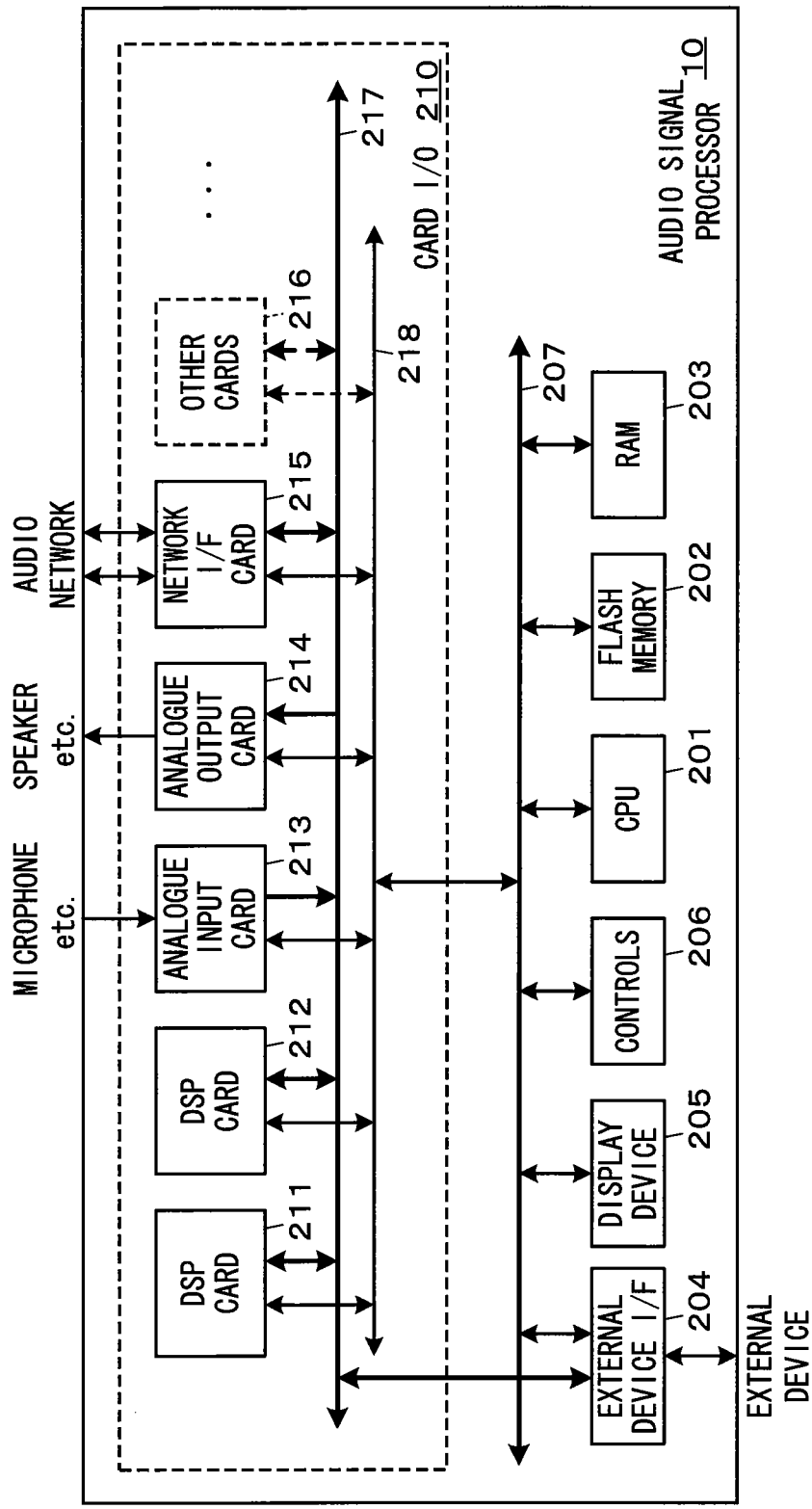
FIG. 7 is a diagram showing the hardware configuration of an audio signal processor that is each of the nodes constituting the audio network system shown in FIG. 1.

The hardware configuration of an audio signal processor that is each of the nodes constituting the above-described audio network system S is shown in FIG. 7.

As shown in FIG. 7, the audio signal processor 10 includes a CPU 201, a flash memory 202, a RAM 203, an external device I/F (interface) 204, a display device 205, and controls 206, which are connected via a system bus 207. The audio signal processor 10 further includes a card I/O (input/output section) 210 connecting the external device I/F 204 and the system bus 207.

The CPU 201, which is a controller that comprehensively controls the audio signal processor 10, can execute a required control program stored in the flash memory 202, thereby controlling display on the display device 205, setting the value of the parameter according to the manipulation of the control 206, controlling the operation of each device, transmitting a command to another audio signal processor via the card I/O 210, and performing process according to the command received from the other audio signal processor via the card I/O 210.

The flash memory 202 is an overwritable non-volatile memory that stores data which should be left even after the power is turned off, such as the control program executed by the CPU 201.

The RAM 203 is a memory that is used to store data which should be temporarily stored and used as a work memory of the CPU 201.

The external device I/F 204 is an interface for connecting various kinds of external devices to perform inputting/outputting, for example, an external display, a mouse, a keyboard for inputting characters, a control panel, a PC (personal computer), and the like.

The external device I/F 204 is also connected to an audio bus 217 of the card I/O 210 and can transmit the waveform data flowing through the audio bus 217 to the external device and input the waveform data received from the external device into the audio bus 217.

The display device 205 is a display device for displaying various kinds of information according to control by the CPU 201, and can be composed, for example, of a liquid crystal display (LCD), a light emitting diode (LED), or the like.

The controls 206 are used for accepting the manipulation to the audio signal processor 10 and can be composed of various keys, buttons, dials, sliders, and the like.

The display device 205 and the controls 206 have configurations greatly different depending on the function of a device such that a large-size display, many buttons, switches, power-faders and so on are provided for accepting setting of signal processing parameters and patches for many channels in the consoles Ca1 and Cb1, and simple lamps and buttons for a power supply and mode setting are provided in the input/output devices IOa1, IOb1 to IOb3.

The card I/O 210 is an interface including the audio bus 217 and a control bus 218. The card I/O 210 makes it possible to input and output the audio signals and the control signal to/from the audio signal processor 10, and perform process on the audio signals and the control signal, by attaching various kinds of card modules to these buses. The card modules attached thereto transmit and receive the waveform data to/from each other via the audio bus 217, and transmit and receive the control signal to/from the CPU 201 via the control bus 218 to be controlled by the CPU 201.

The audio bus 217 is an audio signal transporting local bus which transports the waveform data of a plurality of channels from an arbitrary card to an arbitrary card sample by sample in a time division manner at a timing based on the sampling period. Any one of the plurality of connected cards becomes a master, and the reference timing for the time division transport of the audio bus 217 is controlled based on the wordclock generated and supplied by that card. The other cards become slaves and generate wordclocks of the cards based on the reference timing.

More specifically, the wordclock generated in each card is a common clock in synchronization with the wordclock of the card which has become the master node, and a plurality of cards in the audio signal processor 10 process the waveform data at a common sampling frequency. Each card further transmits and receives the waveform data processed based on its own wordclock and the waveform data which should be processed, to/from the other card via the audio bus 217 at a time division timing based on the above-described reference timing.

FIG. 7 shows an example in which DSP (digital signal processor) cards 211 and 212, an analog input card 213, an analog output card 214, and a network I/F card 215 are attached to the card I/O 210.

Each of the various cards attached to the card I/O 210 executes process on the waveform data according to the function of that card at a timing based on the wordclock (sampling period of the waveform data).

The DSP cards 211 and 212 of them are signal processors which perform various kinds of process including mixing, equalizing, and effect addition on the waveform data acquired from the audio bus 217 at a timing based on the wordclock. They output the processed data to the audio bus 217. They can further accept inputs of the waveform data of a plurality of channels and process the waveform data and then output the waveform data of a plurality of channels.

The analog input card 213 includes an A/D (analog/digital) conversion circuit and has a function of converting the analog audio signals inputted from the audio input device such as a microphone to digital waveform data and supplying it to the audio bus 217. The analog input card 213 can process the signals of a plurality of channels in parallel.

The analog output card 214 includes a D/A (digital/analog) conversion circuit and has a function of converting the digital waveform data acquired from the audio bus 217 to analog audio signals and outputting them to the audio output device such as a speaker or the like.

The network card I/F 215 includes two sets of transmission I/Fs and reception I/Fs and has a function of performing transport of the TL frame 100 in the sub-network which has been described using FIG. 2A to FIG. 6 and a function of reading/writing the waveform data, the control data, and the like from/to the TL frame 100.

It is also possible to attach a plurality of network I/F cards to the card I/O 210. A plurality of network I/F cards are attached to the connecting node like the input/output devices IOa1 and IOb3 shown in FIG. 1, so that the input/output devices IOa1 and IOb3 are connected to separate networks via the respective network I/F cards.

The cards other than the network I/F card 215 among the various cards described above can be arbitrarily selected and attached. For example, if the input/output devices IOa1 and IOb1 to IOb3 shown in FIG. 1 need to perform only signal input/output, the DSP cards 211, 212 are unnecessary. If the mixer engines Ea1 and Eb1 do not perform signal input and output from/into the outside of the system, the analog input card 213 and the analog output card 214 are unnecessary. Further, if the consoles Ca1 and Cb1 perform operation only for parameters, it is not necessary to provide the cards other than the network I/F card 215.

Conversely, it is conceivable that various kinds of card modules such as a digital input/output, a tone generator, a recorder, an effector, and so on can be attached as another card 216 in addition to the aforementioned cards.

As described above, the cards attached to the card I/O 210 process audio signals according to the common wordclock. When the audio signal processor 10 is the wordclock source in the whole audio network system S, one of the attached cards supplies the wordclock to the other cards including the network I/F card 215, and the network IN card 215 transmits the TL frame in each sampling period, as the sub-network master of the sub-network which the audio signal processor 10 belongs to. When the audio signal processor 10 is the slave node in the audio network system S, the network I/F card 215 generates (reproduces) a wordclock based on the reception timing of the TL frame and supplies the wordclock to the other cards attached to the card I/O 210.

Figure 8:
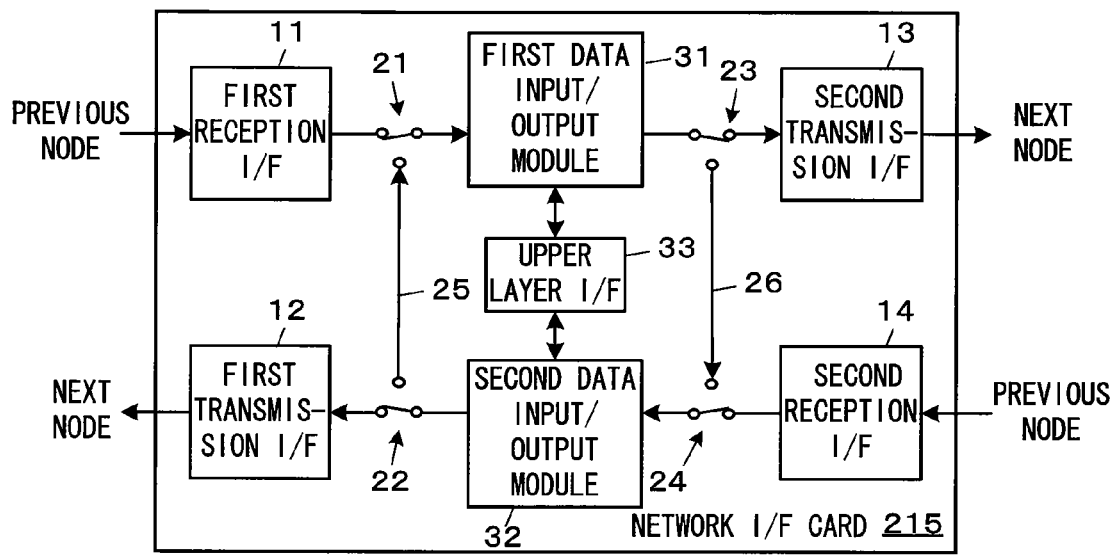
FIG. 8 is a diagram showing, in more detail, the function relating to transport of the TL frame in the network I/F card shown in FIG. 7.

Next, the function of the network I/F card 215 relating to transport of the TL frame 100 is shown in more detail in FIG. 8.

As shown in FIG. 8, the network I/F card 215 includes first and second reception I/Fs 11 and 14 and first and second transmission I/Fs 12 and 13, and also includes selectors 21 to 24 for switching the transport direction of the TL frame 100, first and second data input/output modules 31 and 32 reading and writing data from/into the TL frame 100, and an upper layer I/F 33 that is the interface for inputting/outputting data from/into the audio bus 217 and the control bus 218 and is the interface with parts other than the network I/F card 215 in the audio signal processor 10.

Among them, the first and second reception I/Fs 11 and 14, and the first and second transmission I/Fs 12 and 13 are communication devices corresponding to the two sets of reception I/Fs and transmission I/Fs shown in FIG. 2A and FIG. 2B, each including a predetermined connector (a female side) for connecting a communication cable thereto. For connection of the communication cable, the first reception I/F 11 and the first transmission I/F 12 shall be one set, and the second transmission I/F 13 and the second reception I/F 14 shall be one set. These I/Fs can be I/Fs which perform data communication according to any communication standard as long as they have enough ability for transport of the TL frame in the above-described one sampling period, and an I/F performing data transfer according to the Ethernet of 1 Gbps is employed here.

Each of the first and second data input/output modules 31 and 32 operates based on the operation clock generated by a not-shown operation clock generating module, and functions as a reader that reads desired data such as the waveform data and control data from the TL frame 100 received by a corresponding reception I/F, and a writer that writes desired data such as the waveform data and control data into the received TL frame 100.

Besides, as can be seen from FIG. 2A and the like, the transmission destination of the TL frame 100 from a node that has received the frame may be a device other than the transmission source of the TL frame 100 (the case of the node B in FIG. 2A) or may be the same device as the transmission source (the case of the nodes A and C in FIG. 2A). In the former case, the TL frame 100 is transmitted from a transmission I/F in the pair other than the pair whose reception I/F has received the TL frame 100, whereas in the latter case, the TL frame 100 is transmitted from a transmission I/F paired with the reception I/F which has received the TL frame 100.

The selectors 21 to 24 are provided to switch the transmission destination as described above.

The selectors 23 and 24 among them are selectors for selecting a transmission I/F, among the second transmission I/F 13 and the first transmission I/F 12, from which the TL frame received by the first reception I/F 11 and passed through the first data input/output module 31 is outputted.

The selectors 23 and 24 operate in cooperation such that when the selector 23 selects the second transmission I/F 13 side, the TL frame received by the first reception I/F 11 is transmitted from the second transmission I/F 13, while the selector 24 selects the second reception I/F 14 side to input the TL frame received by the second reception I/F 14 into the second data input/output module 32.

Conversely, when the selector 23 selects the loopback line 26 side, the selector 24 also selects the loopback line 26 side so that the TL frame received by the first reception I/F 11 passes through the loopback line 26 and the second data input/output module 32, and is transmitted from the first transmission I/F 12.

The loopback is based on the assumption that the selector 22 selects the first transmission I/F 12 side. The selectors 21 and 22 also operate in cooperation, similarly to the selectors 23 and 24, such that when the TL frame received by the first reception I/F 11 passes through the first data input/output module 31, the selector 21 selects the first reception I/F 11 side and the selector 22 selects the first transmission I/F 12 side in cooperation. Accordingly, it is possible to select whether or not to loopback the TL frame received by the first reception I/F 11, by switching the selectors 23 and 24.

Similarly, it is also possible to select whether the TL frame received by the second reception I/F 14 and passes through the second data input/output module 32 is looped back or not, by switching the selectors 21 and 22, that is, whether the selectors 21 and 22 select the loopback line 25 side or the other side.

Note that when the TL frame is looped back, the TL frame flashes through both the first and second data input/output modules 31 and 32 in the network I/F card 215. Any one of the first and second data input/output modules 31 and 32, for example, only the module which the TL frame first flashes through needs to read and write data from/into the TL frame.

The frame received by the first reception I/F 11 in the state where the selector 21 selects the loopback line 25 and the frame received by the second reception I/F 14 in the state where the selector 24 selects the loopback line 26 (reception of the aforementioned ITL frame is conceivable) are supplied to a not-shown processing module and subjected to analysis of substance thereof and process according to contents thereof.

In the audio signal processor 10, the function relating to the transport of the TL frame as described using FIG. 2A to FIG. 6 can be realized by the hardware of the network I/F card 215 performing the above-described operation. For more concrete hardware configuration, the configuration described in, for example, Japanese Patent Laid-open Publication No. 2009-94589 can be employed.

According to the above described construction of the audio network system S, in each of the first and second sub-network systems, a ring transmission route running through all of the plurality of nodes belonging to the sub-network system is formed, and a frame having a plurality of transmission channels is periodically circulating along the ring transmission route, the sub-network constituted in the sub-network system conveys an audio signal from one node to an other node in such a way that the one node transmits an audio signal via the sub-network by writing the audio signal into one transmission channel in the circulating frame and the other node receives the audio signal via the sub-network by reading the audio signal from the transmission channel in the circulating frame.

Further, a ring transmission route running through the input/output device IOa1 which is a first connecting node and the input/output device IOb3 which is a second connecting node is formed for the connecting network Sc, and a frame having the plurality of transmission channels is periodically circulating along the transmission route.

2. Connection of Sub-Network Systems by Connecting Node
2.1 Procedure of Forming Transmission Routes in Audio Network System Characteristic points of this embodiment are the operation of the connecting nodes (the input/output modules IOa1 and IOb3 in the example of FIG. 1) when conveying the waveform data between the first sub-network constituted in the first sub-network system Sa and the second sub-network constituted in the second sub-network system Sb across the connecting networks, and the relating operations of the other devices. Hence, these points will be described below.

Figure 9:
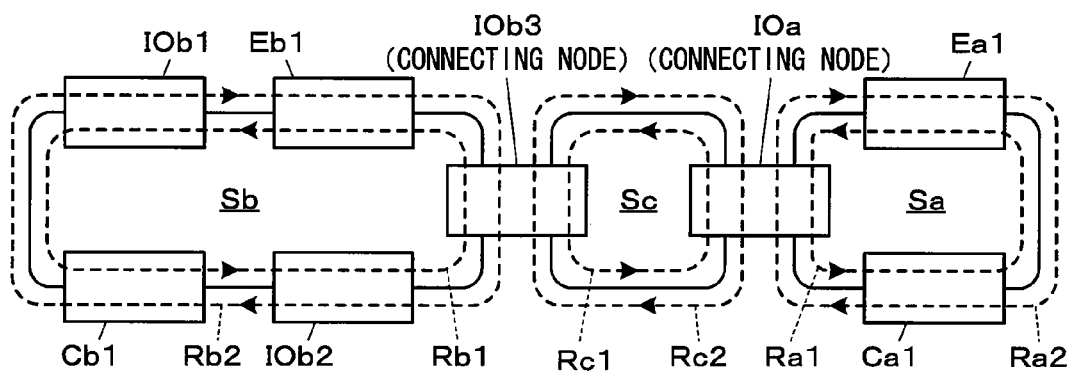
FIG. 9 is a diagram showing transmission routes for the TL frame formed among nodes in the audio network system shown in FIG. 1 when the nodes are connected to form a loop in each sub-network system and the connecting network.
Figure 10:
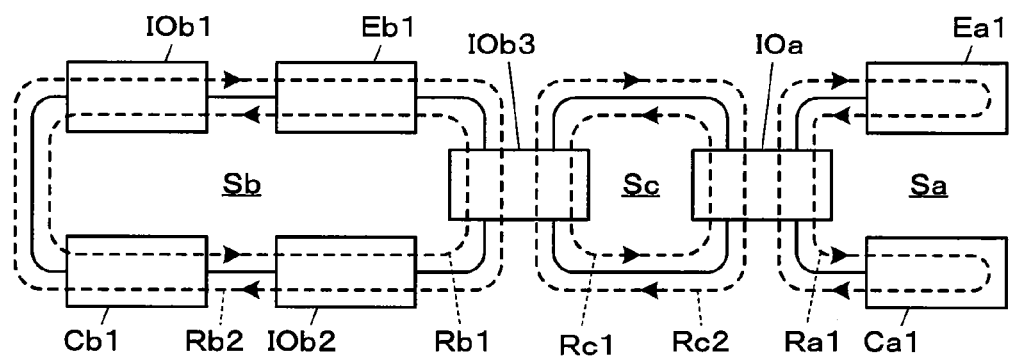
FIG. 10 is a diagram showing transmission routes when the nodes in one of the sub-network systems are connected to form a cascade.

The transmission routes for the TL frame formed among nodes in the audio network system S shown in FIG. 1 are shown in FIG. 9 and FIG. 10. FIG. 9 shows an example when the devices are connected in a loop style in each sub-network system, and FIG. 10 shows an example when the devices are connected in a cascade style only in the first sub-network system Sa.

In the loop style as shown in FIG. 9, two transmission routes each passing through once all of the nodes are formed in the sub-network in each sub-network system and in the connecting network. The formed transmission routes are transmission routes Ra1 and Ra2 in the first sub-network in the first sub-network system Sa, transmission routes Rb1 and Rb2 in the second sub-network in the second sub-network system Sb, and transmission routes Rc1 and Rc2 in the connecting network Sc.

In either case, the two transmission routes formed in the connecting network Sc and the two transmission routes formed in the sub-network which the input/output modules IOa1 and IOb3 belong to, pass through the input/output modules IOa1 and IOb3 which are the connecting nodes, respectively.

In the case where the connection in a part of sub-network systems is in the cascade style as shown in FIG. 10, one loop transmission route looped back in nodes at both ends of the cascade is formed in the sub-network constituted in the sub-network system. In the example of FIG. 10, one transmission route Ra1 is formed in the first sub-network in the first sub-network system Sa. It is of course possible to connect the devices in the cascade style in the other sub-network system. In this case, one loop transmission route looped back in nodes at both ends of the cascade is similarly formed in the sub-network constituted in the other sub-network system.

Figure 11:
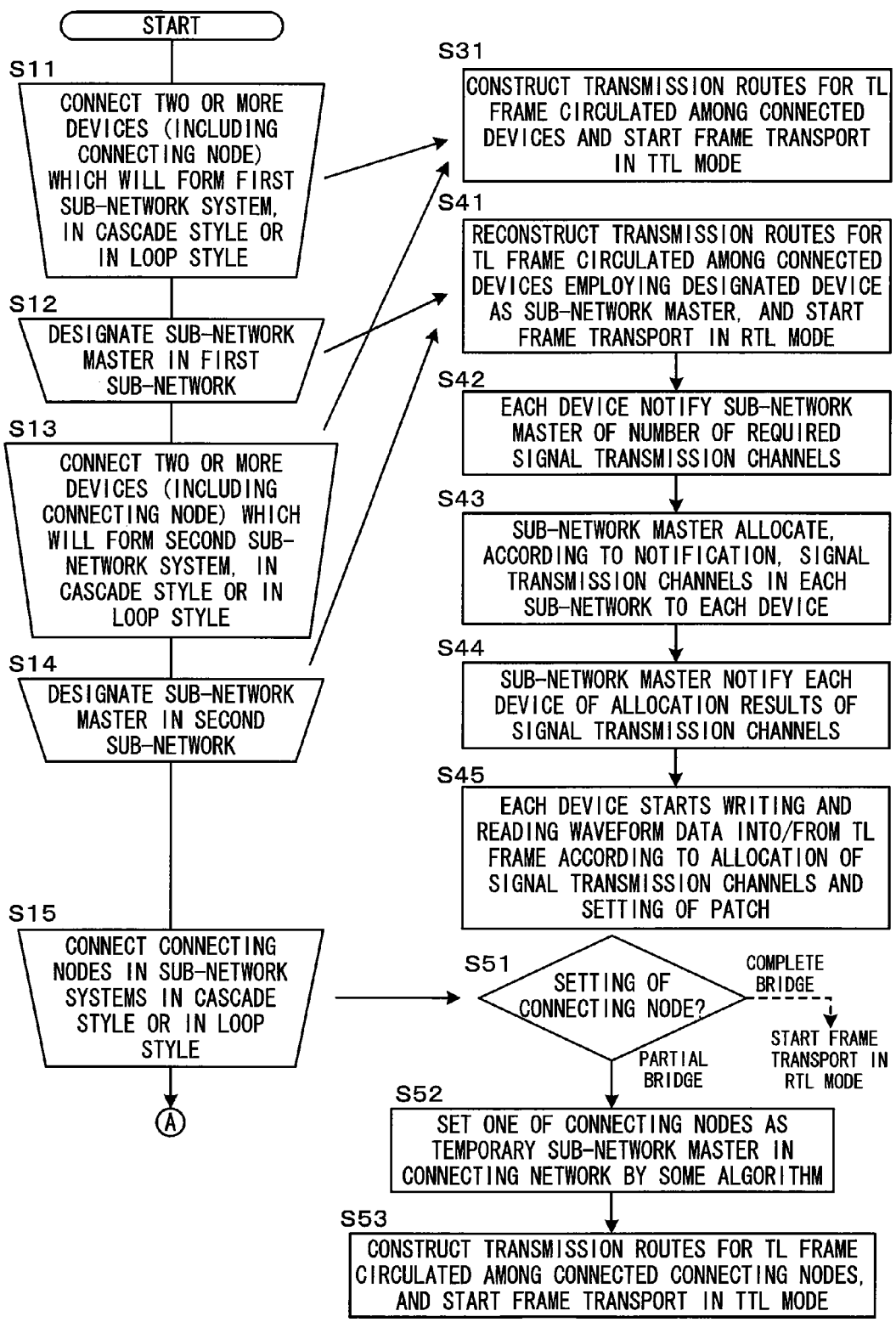
FIG. 11 is a chart showing the work by the user and the operation procedures of devices according to the work when forming the audio network system and the transmission routes for the TL frame.
Figure 12:
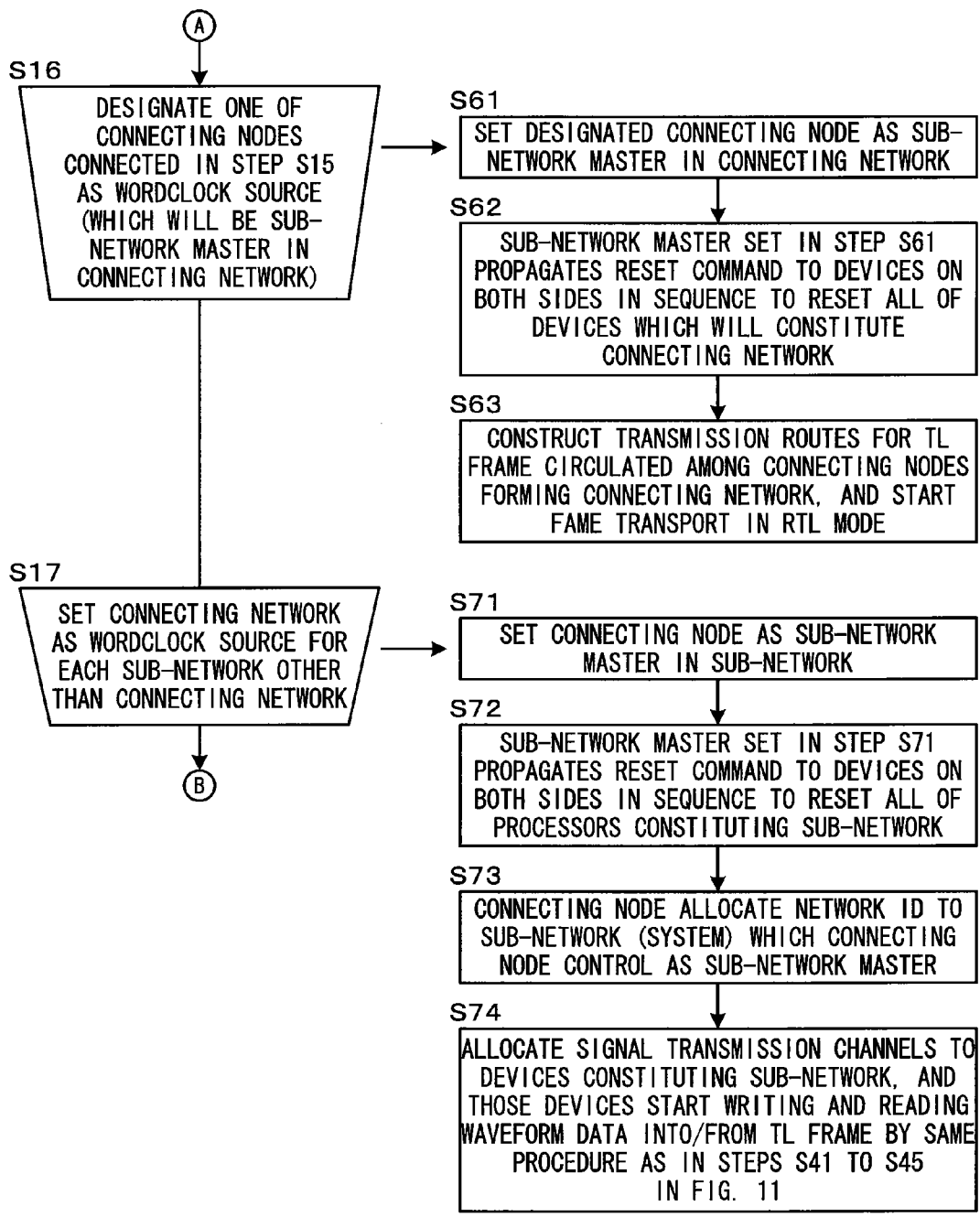
FIG. 12 is a chart showing continuation of the work and the operation procedures in FIG. 11.
Figure 13:
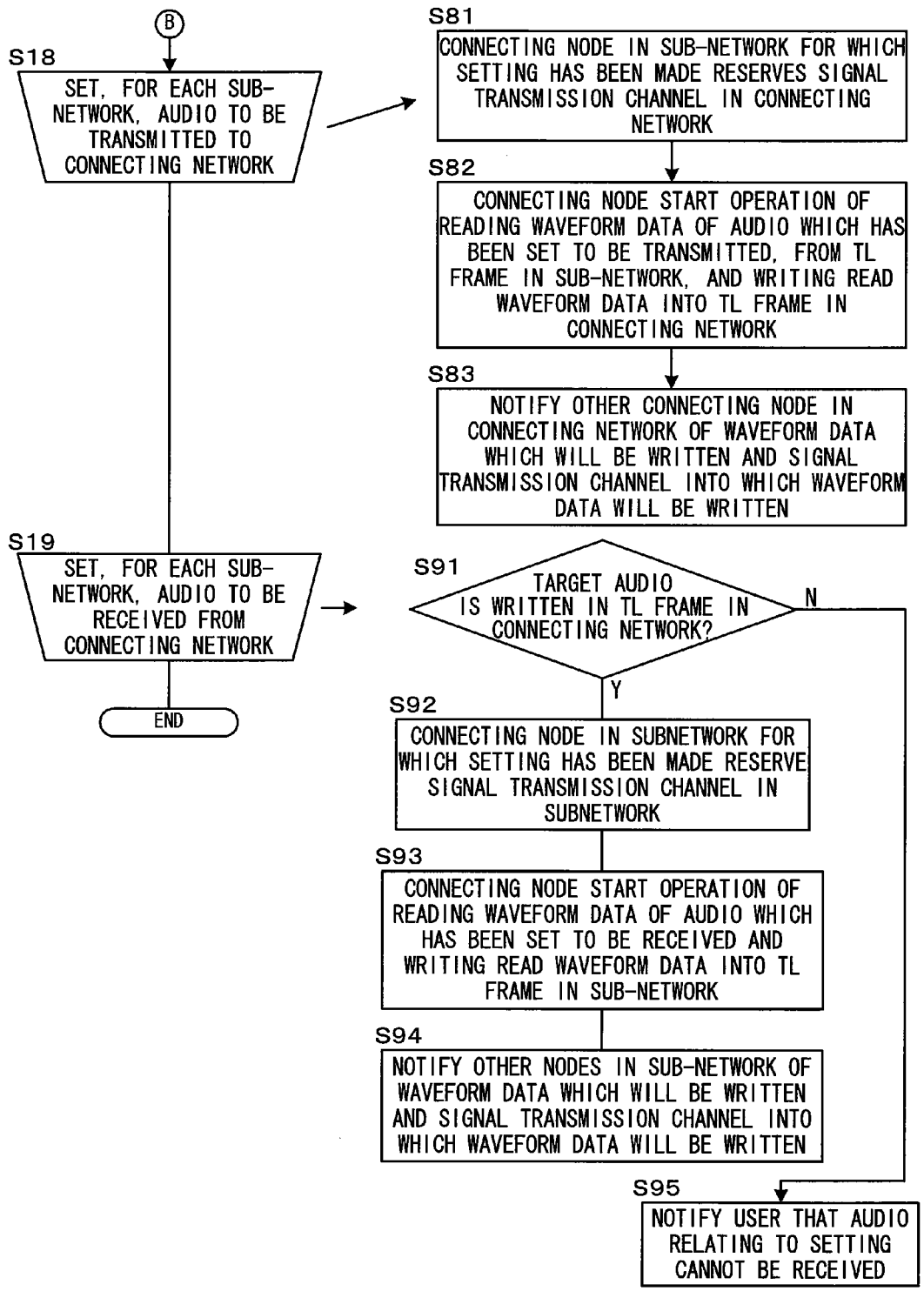
FIG. 13 is a chart showing continuation of the work and the operation procedures in FIG. 12.

Next, FIG. 11 to FIG. 13 show the work by the user and the operation procedures of devices according to the work when forming the audio network system S and the above-described transmission routes for the TL frame. These drawings show the procedures when forming the transmission routes from the state in which the devices are not physically connected to none another.

When forming the audio network system S shown in FIG. 1, the user first connects two or more devices which will form the first sub-network system Sa, in the cascade style of in the loop style (S11). In this event, at least one of the devices needs to be the device which will be the connecting node. Further, the "connection" referred to here includes coupling devices which have been already turned on by a communication cable, turning on devices which have been already coupled by a communication cable, and coupling devices which have not been coupled and turned on yet, by a communication cable and turning on the devices.

After the connection is established, the connected devices automatically confirm the presence of their target devices one another and the topology of the connection (cascade or loop and connection order of the devices), then form the transmission routes for the TL frame as shown in FIG. 9 or FIG. 10 circulating among the connected devices according to the topology, and start transport of the TL frame along the transmission routes (S31).

However, the devices do not read and write the waveform data from/into the TL frame at this stage but operate in the mode (TTL mode) of transmitting control data among the devices using the ITL frame region 107 and the control data region 104 in the TL frame 100. Further, a temporal sub-network master which generates the TL frame is determined by an appropriate algorithm after negotiation among the devices.

As the procedure of forming the transmission routes in this event, the one described in, for example Japanese Patent Laid-open Publication No. 2009-94589 can be employed.

Further, after Step S11, the user designates the sub-network master in the first sub-network which will be constituted in the first sub-network system Sa (S12). This designation is performed preferably, but not necessarily, after completion of Step S31.

After the designation in Step S12, the devices operating in the TTL mode reconstruct the transmission routes for the TL frame circulating among the connected devices employing the node designated in Step S12 as the sub-network master, and start the transport of the TL frame in the mode (RTL mode) capable of reading and writing of the waveform data from/into the TL frame this time (S41). In this step, the first sub-network is constituted in the first sub-network system Sa.

Thereafter, each device notifies the sub-network master in the sub-network which the device belongs to, of the number of transmission channels the device requires (S42). The number of channels notified here indicates that the device writes waveform data of how many channels into the TL frame 100. This value can be the value which the user has previously determined or the value which is automatically determined according to the number of input terminals (input ports) the device includes (in the case where the waveform data inputted from the outside is written) or output channels (in the case where the waveform data processed in the device is written). Note that the number of channels required by the device may be sometimes zero, in which case the device does not need allocation of channels and therefore does not need to notify the number of required channels.

Note that the notification in Step S42 can be performed through the Ethernet frame, addressed to the sub-network master, which is written in the control data region 104 of the TL frame 100 or by sending the ITL frame which is written in the ITL frame region 107 to the sub-network master through sequential relay to the adjacent node. This also applies to the communication between the sub-network master and each device.

Meanwhile, the sub-network master, after receiving the notification in Step S42, allocates, according to the notification, transmission channels in the TL frame 100 of the sub-network which the sub-network master controls, to the device which has originated the notification (S43). There is no problem in allocating any channel to any device, any algorithm is employable, such as allocation of channels from the first notification on a first-come-first-served basis or the like. However, the number of the transmission channels has a limit, and therefore the master node cannot allocate any transmission channel in some case. In this case, it is preferable to notify the user of the impossibility by any means such as display by the console Ca1, lighting of a predetermined lamp or the like. However, even if the allocation is impossible, the device to which no transmission channel has been allocated just cannot write the waveform data into the TL frame 100 but can read the waveform data from the TL frame 100, and is not affected regarding the other operations of the device and operations of the other devices.

The sub-network master further notifies each device, in the sub-network which the sub-network master controls, of the results of the allocation performed in Step S43 (S44). The notification of the allocation result is preferably performed every time new allocation is performed, namely, every time the allocation is changed because each device determines the transmission channel into which the device writes the waveform data referring to the present allocation of the transmission channels.

Each device, when it receives the notification in Step S44, starts writing and reading the waveform data into/from the TL frame according to the allocation of the transmission channels and the setting of patch (S45).

The above processes bring the first sub-network into a state in which the audio signals and the control signals can be conveyed among the devices which are the nodes.

The patch here means, regarding writing of the waveform data into the TL frame, data defining the correspondence between the ID of an input terminal (an input port) or an output channel from which the waveform data is supplied and the number of the transmission channel, among the transmission channels allocated to the device, into which the device writes the supplied waveform data. The patch means, regarding reading of the waveform data from the TL frame, data defining the correspondence between the number of the transmission channel among the transmission channels allocated to the device from which the device reads the waveform data and the position of an input channel or an output terminal (an output port) of the device to which the device supplies the read waveform data.

The patch can be arbitrarily set by the user through setting of a later-described routing table and a default value for each device is prepared in the initial state.

The setting of transmission and reception of the waveform data in each device in each sub-network system is performed as follows.

The console (Ca1, Cb1) in each mixer system (described later in detail) first acquires, from the devices (including the mixer engine) in the sub-network system which the console belongs to, data of the input ports and the output ports for the waveform data included in the devices and the input channels and the output channels included in the mixer engine. Then, the display device of the console displays an input patch setting screen to accept setting of the patch from the input ports of the devices to the input channels of the mixer engine and an output patch setting screen to accept setting of the patch from the output channels of the mixer engine to the output ports of the devices, and accepts patch setting from a desired supply source to a desired supply destination by the user.

The supply sources of the waveform data displayed on the input patch setting screen here are a plurality of input ports and a plurality of reception ports (transmission channels) from the connecting network in the connecting node, and the supply destinations are a plurality of input channels. Further, the supply sources displayed on the output patch setting screen are a plurality of output channels, and the supply destinations are a plurality of output ports and a plurality of transmission ports (transmission channels) to the connecting network in the connecting node.

Further, the "transmission ports to the connecting network" displayed as the supply destination on the output patch setting screen are transmission channels in the connecting network which are allocated to the connecting node, and the "reception ports from the connecting network" displayed as the supply source on the input patch setting screen are transmission channels through which the connecting node in the other sub-network system transmits the waveform data to the connecting network.

Each connecting node notifies the other connecting node in the connecting network of the transmission channels in the connecting network for which the connecting node transmits signals and the signals which the connecting node transmits, as the transmission data. Each connecting node provides data for displaying the "reception ports from the connecting network" as the supply source on the input patch setting screen, to the console based on the transmission data sent from the other connecting node.

When the console accepts the setting of the patch (connection) from one supply source to one supply destination of the waveform data on the input patch setting screen or the output patch setting screen displayed on the console, the console performs transmission setting for the device including the one supply source to transmit the waveform data from the one supply source, or performs reception setting for the device including the one supply destination to receive the waveform data from the one supply source and supply the waveform data to the one supply destination.

The device for which the transmission setting has been performed reserves an unused channel among the transmission channels allocated to that device in the sub-network, as a channel to be used for transmission of the waveform data from the supply source indicated by the transmission setting, and sets (writing setting) the patch in the device so that the waveform data from the supply source is written into the region of the reserved transmission channel in the TL frame. The device then notifies each of the devices in the sub-network system which the device belongs to (for which the device has made the writing setting), of the transmission data indicating that the waveform data from the supply source is written in the reserved transmission channel.

Accordingly, the device for which (one or more) transmission settings have been performed transmits one or more audio signals in the device via the sub-network which the device belongs to using the reserved transmission channels, and notifies information identifying the transmitted audio signals and related with the reserved transmission channels to each of the devices in the sub-network system which the device belongs to (and a remote controller that controls transmission of the audio signals in the sub-network system, provided outside the sub-network system). Signal names are used as the information identifying the transmitted audio signals as described later.

The device for which the reception setting has been performed judges whether or not the signal from the supply source, for which the reception setting has been performed, is written in the region of any transmission channel in the TL frame based on the transmission data sent from other devices, and reads, when the signal is written, the waveform data from the region of the transmission channel in the TL frame and sets (reading setting) the patch in the device so that the read waveform data is supplied to the supply destination indicated by the reception setting.

As described above, the setting of transmission or reception in each device is performed based on the patch setting operation by the user on the console. Note that the patch setting operation may be performed on a PC connected to the external device I/F 204. In this case, the operation of the console described here is performed in cooperation by the PC and the device to which the PC is connected. Further, the performed transmission setting and reception setting may be stored in a non-volatile memory in each device so that at power-on of the device, the connection before power-off is automatically restored based on the stored transmission setting and reception setting. It is needless to say, above described transmission setting and reception setting can be performed regarding a plurality of supply sources and a plurality of supply destinations.

Note that the transmission setting and the reception setting here correspond to the setting of the later-described routing table.

Next, the user connects two or more devices which will form the second sub-network system Sb in the cascade style of in the loop style as in the first sub-network system Sa (S13), and designates the sub-network master the second sub-network which will be constituted in the second sub-network system Sb (S14).

After the connection is established, the connected nodes start the operations in Steps S31 and S41 to S45 as in the first network system Sa to start reading and writing of the waveform data from/into the TL frame transported in the RTL mode. As a result, the second sub-network is constituted in the second sub-network system Sb.

At this moment, the first sub-network system Sa and the second sub-network system Sb independently operate, so that it is not necessary to distinguish these sub-network systems. Therefore, there is no limit to the order of forming the sub-network systems though the order is indicated in FIG. 11, and there is no problem even when the second sub-network system Sa is formed first or when the two sub-network systems are concurrently formed.

After the two sub-networks are respectively constituted in the two sub-network systems by the procedure so far, the user connects the connecting nodes in the sub-network systems, namely, the two or more devices which will form the connecting network in the cascade style of in the loop style (S15). In this event, the connection is established with respect to the network I/F cards in the connecting nodes which are not used for the connection in Steps S11 and S13.

After the connection is established, each of the connecting nodes confirms whether the connection setting effective in the node is a complete bridge or a partial bridge (S51). The connecting node is operable in either connection mode according to the setting.

The complete bridge here means the connection mode in which the allocation of transmission channels is made common in the first sub-network and the second sub-network to make it possible to commonly use the waveform data of all of the transmission channels, and is not described in detail in this specification.

On the other hand, the partial bridge means the connection mode in which only the audio signals and the control signals which need to be conveyed across the sub-networks are conveyed to the other sub-network, and is described in detail in this specification.

For the complete bridge, the first sub-network system and the second sub-network system are connected by the connecting nodes without through the connecting network. Therefore, the device connected to the connecting node in the procedure corresponding to Step S15 is the device forming the other sub-network system which will be connected to the sub-network system which the connecting node first belongs to, and the connecting node circulates the TL frame in the RTL mode among the devices forming the other sub-network system.

For the partial bridge, the procedure proceeds to the process in Step S52 and subsequent thereto.

For the partial bridge, the first sub-network system Sa and the second sub-network system Sb are connected via the connecting network Sc constituted by the connecting nodes as shown in FIG. 1.

Hence, the devices connected in Step S15 automatically confirm the presence of their target devices one another and the topology of the connection in order to constitute the connecting network, and then set one of the connecting nodes as a temporary sub-network master in the connecting network by some algorithm (S52). The devices then form the transmission routes for the TL frame circulated among the connected connecting nodes, and start transport of the TL frame in the TTL mode along the transmission routes (S53). The procedure of forming the transmission routes in this event may be similar to that in Step S31.

Next, the procedure proceeds to a part shown in FIG. 12, in which the user designates one of the connecting nodes connected in Step S15 as a wordclock source of the whole audio network system S (S16). This designation is also the designation of the wordclock source in the connecting network, namely, the designation of the sub-network master of the connecting network. Further, the designation operation may be performed by directly operating the device which is to be the sub-network master or by operating another device.

Upon designation in Step S16, the devices connected until then transport, from the device accepting the designation operation to the connecting node which is newly designated as the wordclock source, a command indicating that the connecting node is designated as the sub-network master in the connecting network using the Ethernet frame or the ITL frame, and the device which receives the command sets the device itself as the sub-network master in the connecting network (S61).

Thereafter, the device set as the sub-network master propagates a reset command to the devices on both sides in sequence and resets also the device itself to thereby reset all of the devices which will constitute the connecting network (S62). However, what is reset here is only the network I/F card 215 for use in constituting the connecting network and the function relating to the communication via the card. Accordingly, the operation relating to the communication in the sub-networks is continued even after the reset.

In each of the network OF cards 215 in a reset state, all of the selectors 21 to 24 shown in FIG. 8 select the loopback lines 25 and 26 sides. Therefore, with the reset, the loop transmission routes in the connecting network disappear. However, the device set as the sub-network master keeps grasping, even after the reset, the fact that the device itself should be the sub-network master at forming of the connecting network.

After the reset of all of the devices is completed, the connecting nodes form the connecting network and start transport of the TL frame in the RTL mode as in Step S41 in FIG. 11 (S63). Note that it is not necessary to allocate transmission channels to the connecting nodes yet at this moment. Therefore, it is also unnecessary to convey audio signals in the connecting network.

Then, the user designates the connecting network as the wordclock source for each of the sub-networks other than the connecting network (S17). This designation can be performed by designating the connecting node as the sub-network master in the sub-network constituted in the sub-network system. Further, the designation operation may also be performed by directly operating the device which is the sub-network master or by operating another device.

Upon designation in Step S17, the devices in the sub-networks for which the designation has been made transport a command indicating that the connecting node is designated as the sub-network master in the sub-network, to the connecting node, and the connecting node sets the node itself as the sub-network master in the sub-network as in Step S61 (S71).

Thereafter, the connecting node that has become the sub-network master propagates a reset command to the devices on both sides in sequence and resets also the connecting device itself to thereby reset all of the devices constituting the sub-network relating to the designation in Step S17 as in Step S62 (S72). However, what is reset here is only the network I/F card 215 for use in constituting the sub-network relating to the designation and the function relating to the communication via the card. Accordingly, the operation relating to the communication in the connecting network is continued even after the reset.

After the reset, the connecting node which is the sub-network master in the sub-network automatically generates a unique network ID not overlapping with that of the other sub-network, and allocates the network ID to the sub-network which the connecting node controls as the sub-network master (S73). This means that the network ID is allocated also to the sub-network system in which the sub-network is constituted. Note that the network ID may be manually set by the user.

Thereafter, the devices of the sub-network system form the sub-network using the connecting node as the sub-network master and start transport of the TL frame in the RTL mode, and start reading and writing the waveform data from/into the TL frame by the same procedure as in Steps S41 to S45 in FIG. 11 (S74).

In this event, the connecting node as the wordclock source in the sub-network generates a wordclock to be used in the sub-network in the same period as the reception period of the TL frame, based on the reception timing of the TL frame in the connecting network. The connecting node determines the transmission timing of the TL frame in the sub-network based on the generated wordclock to synchronize the transmission period of the TL frame in the connecting network with the transmission period in the sub-network.

After the processes in Steps S71 to S74 are completed for all of the sub-networks, the audio network system S conveys audio signals and control signals among the nodes in each of the sub-network systems, and bridges the sub-network systems by the connecting network, so that necessary signals can be forwarded to a different sub-network across the connecting network.

The procedure then proceeds to a part shown in FIG. 13, and the user performs concrete setting of the transport of audio signals. More specifically, the user sets, for each sub-network, audio signals to be transmitted to the connecting network Sc (S18). Though details will be described later, this setting is the setting of routing to determine which audio signal, among the audio signals conveyed by the sub-network, is to be forwarded via the connecting network Sc. Further, this setting can be performed by operating an arbitrary device capable of operation to the connecting node in the sub-network relating to the setting.

After this setting is made, the connecting node in the sub-network for which the setting has been made reserves a transmission channel in the connecting network (S81), and starts the operation of reading the waveform data for which forward via the connecting network is set, from the TL frame in the sub-network, and writing the read waveform data into the TL frame in the connecting network (S82). The connecting node then notifies the other connecting node in the connecting network of waveform data which will be written and the transmission channel into which the waveform data will be written (S83).

The connecting node then performs reading and writing started in Step S82 in each sampling period to thereby forward the waveform data conveyed by the sub-network to the other connecting node via the connecting network, so that the other connecting node can arbitrarily read the waveform data.

For reservation of the transmission channel in Step S81, the connecting node may request the sub-network master in the connecting network to allocate a transmission channel every time it becomes necessary, or may select an unused transmission channel from among the transmission channels allocated in advance to the connecting node. Besides, when the transmission channel cannot be reserved, it is impossible to increase the number of audio signals to be forwarded across the connecting network any more, which causes no trouble in conveyance of the audio signals by the sub-network.

The user performs the setting in Step S18 as needed, and then sets, for each sub-network, the audio to be received from the connecting network Sc (S19). Though details will be described later, this setting is the setting of routing to determine which audio signal, among the audio signals forwarded to the other sub-network across the connecting network Sc, is to be sent to the sub-network system so that the devices belonging to the sub-network can read the audio signal. This setting can also be performed by operating an arbitrary device capable of operation to the connecting node in the sub-network relating to the setting.

After this setting is made, when the waveform data of the target audio is written in the TL frame in the connecting network (YES in S91), the connecting node in the sub-network for which the setting has been made reserves a transmission channel in the sub-network (S92), and starts the operation of reading the waveform data for which sending to the sub-network has been set, from the TL frame in the connecting network referring to the data sent in Step S83, and writing the read waveform data into the TL frame in the sub-network (S93). The connecting node then notifies the other nodes in the sub-network of waveform data which will be written and the transmission channel into which the waveform data will be written (S94).

The connecting node then performs reading and writing started in Step S93 in each sampling period to thereby enable each node in the sub-network which the connecting node controls as the sub-network master to arbitrarily read the waveform data forwarded via the connecting network Sc. In order for each node to use the waveform data, it is only necessary to set the node to read the waveform data from the transmission channel into which the connecting node has written the waveform data.

The reservation of the transmission channel in Step S92 is performed similarly in Step S81, but the allocation is performed by the connecting node itself.

When NO in Step S91, a message is displayed on the display in the device which has accepted the setting in Step S19 or the like to notify the user that the audio signal relating to the setting cannot be received (S95). However, the settings themselves are left in this case so that the connecting node can perform the process in Step S92 and subsequent thereto at the time when the waveform data of the target audio signal comes to be written into the TL frame in the connecting network.

Through the above procedure, the audio network system S can initiate a forwarding operation of desired audio signals among the audio signals conveyed by the respective sub-networks to the other sub-network via the connecting network Sc so that the node belonging to the other sub-network can use the desired audio signal.

In this case, any numbers of the settings in Step S18 and S19 can be performed in any order, and it is also conceivable that some device automatically reads the setting of the routing stored in advance and reflect the setting in the operation of the system.

2.2 Procedure of Signal Transport (Bridge) Across Connecting Network

Next, the operations for the bridge of the audio signals performed by the devices constituting the audio network system S will be described more concretely.

Figure 14:
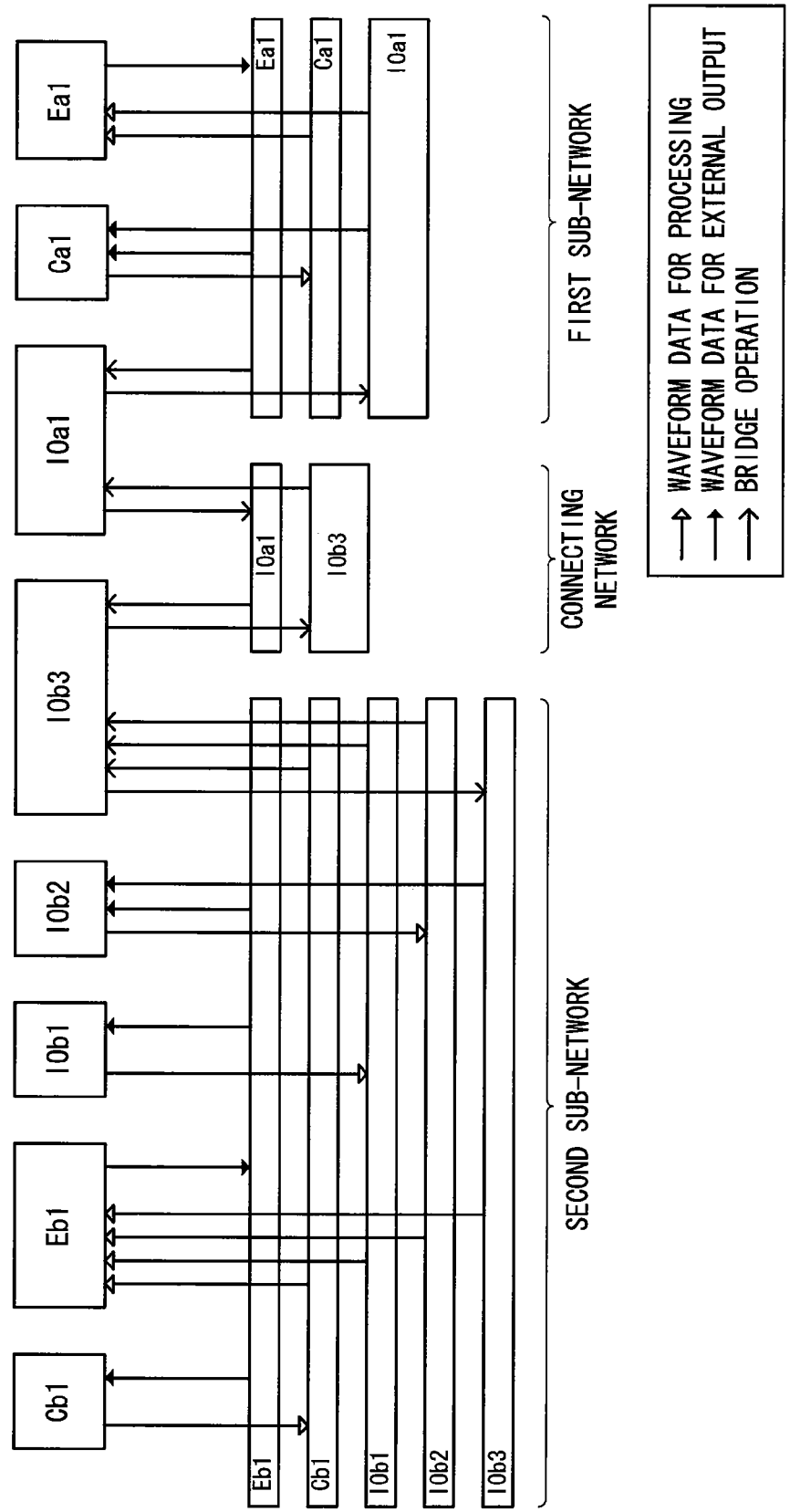
FIG. 14 is an illustration schematically showing the data flow in reading and writing of the waveform data from/into the TL frame performed by the devices constituting the audio network system.

FIG. 14 schematically shows the data flow in reading and writing of the waveform data from/into the TL frame performed by the devices constituting the audio network system S.

In this drawing, three kinds of arrows indicate the positions in the waveform data region, in the TL frame, from which the devices read data and the positions in the waveform data region into which the devices write data in the first sub-network, the second sub-network and the connecting network.

Three bands in the first sub-network, two bands in the connecting network, and five bands in the second sub-network, shown on the lower side in the drawing, indicate waveform data regions corresponding to the waveform transmission channels allocated to the devices belonging to the networks shown in FIG. 4 in the waveform data regions 103 in the TL frames 100 circulated in the first sub-network, the second sub-network and the connecting network, respectively.

Note that the expansion in the horizontal direction in FIG. 14 corresponds to the circulation range of the corresponding TL frame.

The arrow extending from a box indicating the device on the upper side in the drawing to the band indicating the waveform data region means that the device writes the waveform data into the region, and the arrow extending from the band indicating a waveform data region to the box indicating the device means that the device reads the waveform data from the region.

Regarding the input/output device IOa1, the arrows, which are illustrated between the input/output device IOa1 and the waveform data regions both in the first sub-network and the connecting network, mean that the input/output device IOa1 reads and writes the waveform data from/into both of the waveform data regions. However, as described above, the network I/F card to be used in reading and writing is different for each target network. This also applies to the input/output device IOb3.

Regarding the kinds of the arrows, the arrow with a white tip indicates reading and writing of the waveform data to be supplied for the signal processing by the mixer engine Ea1 or Eb1. The arrow with a black tip indicates reading and writing of the waveform data to be outputted to the outside. The arrow with a line tip indicates reading and writing of the waveform data for the bridge operation by the connecting node.

Note that the reading and writing shown in the drawing is an example, and one or both of reading and writing of the waveform data is not performed and other reading and writing is performed in some cases depending on the setting of the routing made in each device.

Further, when the waveform data is written into the region of a transmission channel of the TL frame, the waveform data will be written over the waveform data which has been written in the region in a previous sample period. Therefore, a plurality of devices cannot write the waveform data into one waveform transmission channel. However, even if the waveform data is read, the reading never affects the waveform data written in the TL frame. Therefore, a plurality of devices can read the waveform data from one waveform transmission channel.

Based on the above state, the flow of process in the system from when the waveform data is inputted into the audio network system S to when the waveform data is outputted from the audio network system S will be described together with the operations of the devices with reference also to FIG. 15 and FIG. 16.

Figure 15:
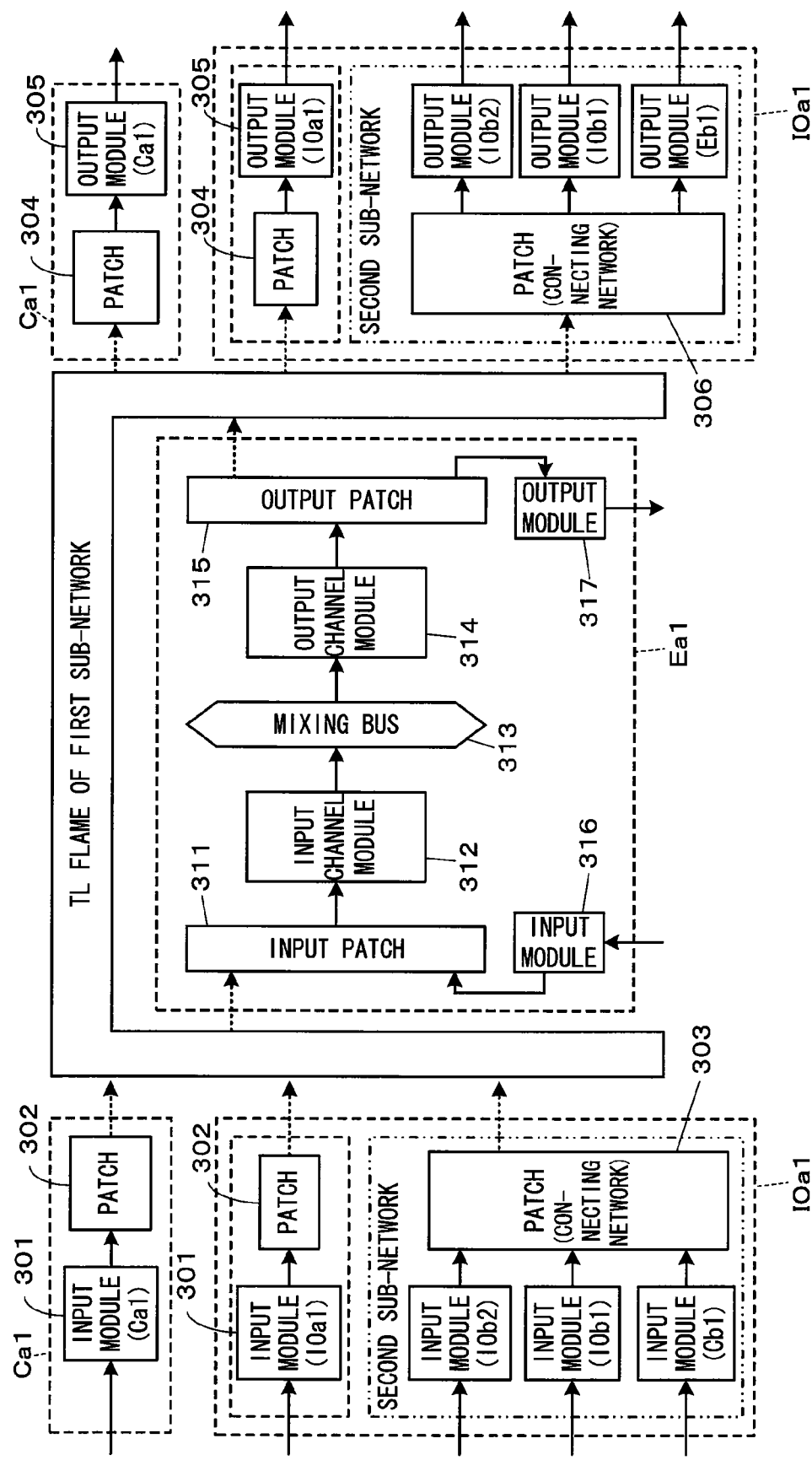
FIG. 15 is a functional block diagram showing the functions implemented by the operations of the devices constituting the audio network system while focusing interest on the devices which belong to the first sub-network system.

FIG. 15 is a functional block diagram (of a first mixer system MSa) showing the functions implemented by the operations of the devices constituting the audio network system S while focusing interest on the devices constituting the first sub-network system Sa. FIG. 16 is a similar functional block diagram (of a second mixer system MSb) while focusing interest on the devices constituting the second sub-network system Sb.

Figure 16:
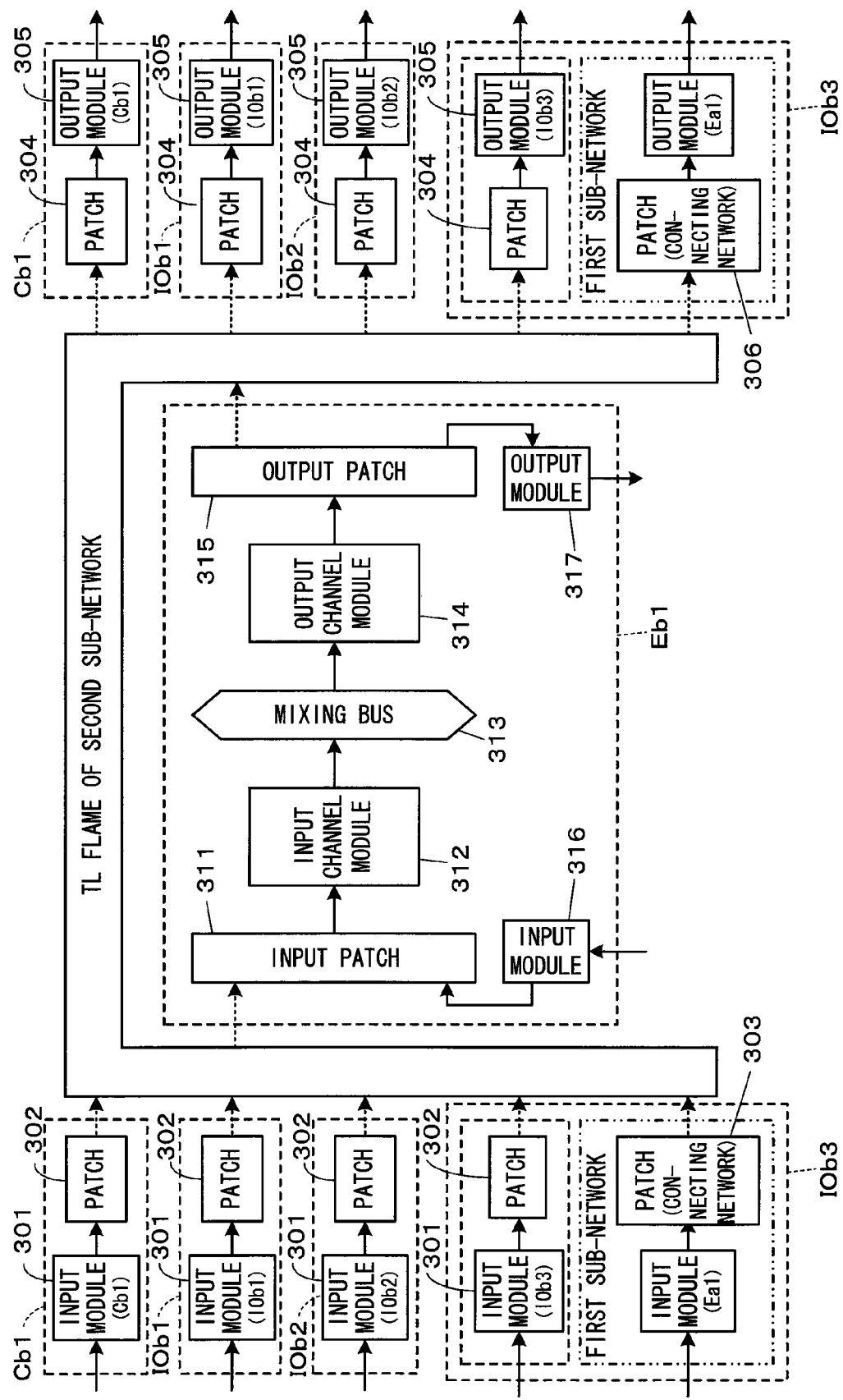
FIG. 16 is a similar functional block diagram while focusing interest on the devices in the second sub-network system.

In the example shown in FIG. 14 to FIG. 16, the waveform data is inputted into the audio network system S through the input/output devices IOa1 and IOb1 to IOb3 and the consoles Ca1 and Cb1.

Further, as shown in FIG. 15 and FIG. 16, in each of the input/output devices IOa1 and IOb1 to IOb3 and the consoles Ca1 and Cb1, a patch 302 is set in advance in such a manner that the transmission channels allocated to the device, in the TL frame in the sub-network which the device belongs to, are corresponded with any number of input ports corresponding to the terminals included in an input module 301 of the device respectively. However, it is not necessary for the user to grasp the concrete IDs of the transmission channels when performing the setting. This point will be described in detail later.

Each of the input/output devices IOa1 and IOb1 to IOb3 and the consoles Ca1 and Cb1 writes the waveform data (which may be obtained by AD converting analog audio signals or may be digital input) inputted from each terminal of the input module 301 into the region of the transmission channel associated with the input port corresponding to the terminal, in the TL frame circulated in the sub-network system which the input/output device IOa1 or IOb1 to IOb3, the console Ca1 or Cb1 belongs to. By this writing, each waveform data has been inputted into the sub-network which the device having been performed the writing of the waveform data belongs to.

The connecting node belongs to the two networks, that is, the first or second sub-network and the connecting network, and the position into which the connecting node writes the waveform data according to the setting by the input patch 302 is the TL frame in the first or second sub-network.

The waveform data inputted into the input module belonging to the sub-network different from the sub-network of interest is written into the region of any of the transmission channels in the TL frame in the sub-network of interest, according to the correspondence set in a patch 303.

The patch 303 is indicated by one box here, but this function is implemented not only by the patch in the input/output device which receives the waveform data inputted from the outside and transmits the waveform data but also by the connecting node in the sub-network on the waveform data transmission side and the connecting node in the sub-network on the waveform data reception side, in cooperation.

For example, in the example in FIG. 15, the input/output device IOb3 reads the waveform data to be forwarded to the first sub-network (here, the waveform data inputted through the input modules 301 of the input/output devices IOb1 and IOb2 and the console Cb1 and written into the TL frame in the second sub-network by those devices), from the TL frame in the second sub-network, and writes the read waveform data into the regions of the waveform transmission channels, in the TL frame in the connecting network, allocated to the input/output device IOb3, according to the setting of the routing made in the input/output device IOb3. This operation corresponds to a part of the operation of a patch 306 shown in a frame of the input/output device IOb3 in FIG. 16.

The input/output device IOa1 then writes the waveform data to be inputted into the first sub-network among the waveform data which the input/output device IOb3 has written into the TL frame in the connecting network, into the regions of the waveform transmission channels, in the TL frame in the first sub-network, allocated to the input/output device IOa1 according to the setting of the routing made in the input/output device IOa1.

The above operation realizes the bridge of the audio signals by the patch 303 to forward the waveform data inputted into the devices belonging to the second sub-network to the first sub-network.

Note that because the setting has been made such that, for example, the waveform data inputted from the input/output device IOb3 is not bridged to the first sub-network, the box indicating the input/output device IOb3 is not shown in the example in FIG. 15. However, it is of course possible to change the setting of the routing so as to bridge also such waveform data to the first sub-network.

Meanwhile, in the mixer engines Ea1 and Eb1, an input patch 311 (individual patch setting) shown in FIG. 15 is set in advance to correspond the transmission channel in the TL frame from which the waveform data is read and the number of the input channel, among the plurality of input channels included in an input channel module 312, into which the read waveform data is to be inputted.

Note that respective devices which write waveform data into the transmission channels in the TL frame notifies the other devices in the same sub-network of the correspondence between the input port, output channel or reception port (from the connecting network) in a device from which waveform data has been inputted, and the transmission channel into which the inputted waveform data is written in the TL frame, as the transmission information indicating the status of that transmission channel.

In this event, the information indicating "the port or output channel in a device" is shared in the sub-network as a name of signal unique in the audio network system S, identifying the port or output channel (and thereby identifying the audio signal inputted therethrough), so that the user can set the input patch 311 using the name of signal. Accordingly, it is unnecessary for the user to grasp the ID of the transmission channel when setting the input patch 311. This point will be described later in more detail. Further, it is also unnecessary, when setting the input patch 311, to distinguish whether the waveform data to be read is the one that has been inputted through the device in the same sub-network or the one that has been forwarded from the other sub-network, and it is possible to read either waveform data in the same manner and input the read waveform data into the input channel.

The mixer engines Ea1 and Eb1 further equipped with an input module 316 for directly accepting input of the waveform data from the outside without through the TL frame, and the input patch 311 can be also set in such a way that the waveform data inputted through the input module 316 is inputted into an input channel.

The mixer engines Ea1 and Eb1 then inputs the waveform data read from the TL frame and the waveform data inputted from the input module 316 into the input channels associated with the transmission channels by the input patch 311 according to the setting by the input patch 311.

Each input channel performs signal processing such as level adjustment, frequency characteristic adjustment, sound image localization position adjustment and the like on the inputted waveform data, and then inputs the resulting waveform data into a mixing bus 313. A plurality of lines are provided in the mixing bus 313, and the output level from each input channel to each line can be arbitrarily set by the user.

The bus in each line mixes the waveform data inputted from the input channels, and inputs the result of the mixing into an output channel of an output channel module 314 that is provided corresponding to the line of the bus. The output channel performs signal processing such as level adjustment, frequency characteristic adjustment and the like on the waveform data outputted from the mixing bus 313.

Further, an output patch 315 (individual patch setting) is set in advance in such a manner that each output channel is corresponded to one of the transmission channels allocated to the mixer engine Ea1 or Eb1 in the sub-network which the mixer engine Ea1 or Eb1 belongs to. The mixer engine Ea1 and Eb1 further include an output module 317 for directly outputting the waveform data to the outside without through the TL frame, and the output patch 315 can also bring an output channel into correspondence with the output module 317.

The mixer engines Ea1 and Eb1 write the waveform data processed in each output channel into the region of the transmission channel corresponded to the output channel in the TL frame in the sub-network which the mixer engine Ea1 or Eb1 belongs to, or outputs the waveform data from the output module 317, according to the setting by the output patch 315.

Further, in each of the input/output devices IOa1 and IOb1 to IOb3 and the consoles Ca1 and Cb1, a patch 304 is set in advance in such a manner that each of any number of output ports corresponding to the terminals included in an output module 305 of the device is corresponded to a transmission channel in which the waveform data has been written, among the transmission channels in the TL frame in the sub-network which the device belongs to. However, it is not necessary for the user to grasp the concrete IDs of the transmission channels also when performing the setting here. This point will be described in detail later.

Each of the input/output devices IOa1 and IOb1 to IOb3 and the consoles Ca1 and Cb1 outputs the waveform data read from each transmission channel in the TL frame, from the output module 305 according to the correspondence set in the patch 304. Also in this event, it is possible to read the waveform data irrespective of the origin of the waveform data, as in the case of the input patch 311, and input the read waveform data into an output port and then output the waveform data to the outside from the output terminal corresponding to the output port (which may be outputted as analog audio signals after DA conversion or may be digital output).

Note that the connecting node belongs to the two networks, that is, the first or second sub-network and the connecting network, and the waveform data which the connecting node reads according to the setting by the patch 304 is basically the waveform data written in the TL frame in the first or second sub-network. Incidentally, it is also conceivable that the connecting node is capable of reading the waveform data written in the TL frame in the connecting network.

Further, the waveform data to be forwarded to the devices belonging to the different sub-network is conveyed to that different sub-network via the connecting network Sc according to the correspondence set in the patch 306.

The patch 306 is indicated by one box here, but this function is implemented, like the patch 303, not only by the patch in the input/output device which receives the waveform data and outputs the waveform data to the outside but also by the connecting node in the sub-network on the waveform data transmission side and the connecting node in the sub-network on the waveform data reception side, in cooperation.

For example, in the example in FIG. 15, the input/output device IOa1 reads the waveform data to be forwarded to the second sub-network (here, the waveform data written into the TL frame in the first sub-network by the mixer engine Ea1), from the TL frame in the first sub-network, and writes the read waveform data into the regions of the transmission channels, in the TL frame in the connecting network, allocated to the input/output device IOa1, according to the setting of the routing made in the input/output device IOa1. This operation corresponds to a part of the operation of the patch 303 shown in the input/output device IOb3 in FIG. 16.

Further, The input/output device IOb3 writes the waveform data to be inputted into the second sub-network among the waveform data which the input/output device IOa1 has written into the TL frame in the connecting network, into the regions of the transmission channels, in the TL frame in the second sub-network, allocated to the input/output device IOb3 according to the setting of the routing made in the input/output device IOb3.

The above operation realizes the bridge of the audio signals by the patch 306 to forward the waveform data inputted into the device belonging to the first sub-network system Sa or the waveform data outputted from the device belonging to the first sub-network system Sa, to the second sub-network constituted in the second sub-network system Sb. Note that to supply concrete devices such as the input/output devices IOb1 and IOb2 and the mixer engine Eb1, it is necessary for these devices to be set to read the waveform data forwarded from the first sub-network as the setting in the patches 304 shown in FIG. 16.

Note that because the setting has been made such that, for example, the input/output device IOb3 does not read the waveform data forwarded from the first sub-network, the box indicating the input/output device IOb3 is not shown in the example of FIG. 15. However, it is of course possible to change the setting of the routing so that the input/output device IOb3 also reads the waveform data forwarded from the first sub-network.

As described above, in the audio network system S, even if the transmission routes for the TL frame are separated in the first sub-network and the second sub-network, signal transport of desired waveform data to a different sub-network system can be easily performed by the bridge operation by the input/output devices IOa1 and IOb3 that are the connecting nodes.

In this case, the setting of the routing can also be easily performed, and this point will be described later.

In the case where each sub-network system is formed in the loop style, even when a break of wire occurs at one location in each sub-network system, the signal transport can be continued in the sub-network constituted in the sub-network system in which the break of wire has occurred, as the sub-network system in the cascade style. Accordingly, the tolerance to the break of wire can be enhanced in this case as compared to the case where the whole audio networks system S is formed in one loop.

Besides, since the limit in the length of the transmission route is applied to each sub-network system through which the TL frame is circulated, the connecting cable can be extended to install the devices in a wider range as compared to the case where one TL frame is circulated in the whole audio network system S.

3. Setting of Routing

As has been described, the setting of the routing defines the route through which the waveform data is transported in the audio network system S. The user can perform this setting collectively for the setting of the device on the transmission side (transmission setting) and the device on the reception side (reception setting) using the above-described input patch setting screen and output patch setting screen, or individually for the setting of a device (transmission setting, reception setting or connection setting in the device) using the individual patch setting screen for each device. Note that the connection setting in the mixer engine can also be performed on the input patch setting screen and output patch setting screen.

The user can perform this setting, identifying the waveform data conveyed in the audio network system S by the waveform data name uniquely named in the audio network system S.

Hereinafter, the procedure of setting the routing and the process for reflecting the setting in the operation of each device will be described.

First, an example of the signal name setting table is shown in FIG. 17.

The signal name setting table is a table to be stored in each of the devices constituting the audio network system S, and for setting, for each of the input ports and the output channels included in the device, a signal name to the waveform data inputted from the input port into the device or the waveform data outputted from the output channel.

This signal name shall be the one that is made based on the name which has been arbitrarily set by the user and has an automatically generated additional name added thereto, to be a unique name in the audio network system S. For example, a unique ID is prepared for each of the devices in the audio network system S or the mixer systems MSa and MSb. Therefore, the user inputs a name unique in the device and adds the unique ID of the device as the additional name, whereby a unique signal name in the system can be obtained.

Note that the signal name can be set at any timing regardless of before or after or while the devices form the sub-networks and the connecting network in the audio network system S. Further, it is also conceivable that a controller that controls transmission of the audio signals in a sub-network system, like the console Ca1 or Cb1, gives a signal name designated by a user to each of audio signals which are input to input ports of the respective devices or processed in output channels of the mixer engine in the sub-network, and notifies the signal names of the audio signals to the device which inputs the audio signals via the input ports or the mixer engine in the subnetwork which processes the audio signals via the output channels.

Next, an example of the routing table is shown in FIG. 18.

The routing table is a table to be also stored in each of the devices constituting the audio network system S, and for defining the waveform data transport process performed by the device. The waveform data transport referred to here includes writing into the TL frame (transmission setting), reading from the TL frame (reception setting), and transport inside the device without through the TL frame (connection setting: for example, the transport from the input module 316 to the input channel module 312 in FIG. 15).

Among the data to be registered in the routing table, data in one row indicates one routing setting, and the ID is identification data for identifying the setting in each row.

The supply source is data indicating the position from which the waveform data is supplied. In the supply source, any of an input port number and an output channel number of the device and the network which the device belongs to (data identifying the sub-network or the connecting network) can be set.

The signal name is data indicating the signal name of the waveform data supplied from the supply source. When an input port number or an output channel number is set in the supply source, the signal name is automatically set based on the data of the signal name setting table. When the network is set in the supply source, one signal name is selected from among the signal names of the waveform data readable from the TL frame in that network.

As will be described later, when writing the waveform data into the TL frame in a network, each device notifies all of the device belonging to that network, of the transmission channels into which waveform data will be written and the signal names of the waveform data which will be written into the respective transmission channel. Each of the notified devices stores this relation into a channel table as shown in FIG. 22. Accordingly, each of the notified devices can select the waveform data to be read from the TL frame through use of the signal name described in the channel table relating to the sub-network in which the TL frame is circulated, and register the signal name into the routing table.

Next, the supply destination is data indicating the position to which the waveform data is supplied. In the supply destination, any of an output port number and an input channel number of the device and the network which the device belongs to can be set.

Besides, the "implementation" is data indicating whether or not the signal transport relating to each routing setting has been implemented. The "implementation" is provided for the reason that despite the routing setting, if the signal input card corresponding to the input port set as the supply source is not attached yet or the transmission channel cannot be reserved in the network set as the supply destination, the signal transport relating to each routing setting may not be implemented. Each device periodically confirms the status of the signal transport relating to each routing setting and updates the data of the "implementation".

Note that setting of the same network both in the supply source and the supply destination is prohibited in the above routing table. This is because this setting means that the waveform data read from the TL frame is written again into the same TL frame, and such signal transport is merely wasteful use of the transmission channel.

As the routing setting as described above, in a device, setting of an input port or an output channel as the supply source and setting of a sub-network as the supply destination means setting to realize such a signal that the waveform data inputted from the input port or the waveform data outputted from the output channel is written into the TL frame in the sub-network which the device belongs to so that the other devices belonging to the same sub-network can read the written waveform data.

Besides, setting, in a device, of a signal name of one of the signals written into the TL frame in the sub-network which the device belongs to as the signal name (in this case, the sub-network will be set as the supply source) and setting of an output port or an input channel as the supply destination means setting to realize such a signal transport that the waveform data indicated by the signal name is outputted thorough the output port or the waveform data indicated by the signal name is inputted into the input channel.

In the connecting node, the connecting network is set in place of the sub-network as in the similar manner to the above, whereby the signal transport can also be performed between a port or a channel of the connecting node itself and the connecting network without through any sub-network.

Further, setting, in the connecting node, of a signal name of one of the signals written into the TL frame in the sub-network as the signal name (in this case, the sub-network will be set as the supply source) and setting of the connecting network as the supply destination means to realize such a signal transport that the connecting node bridges the waveform data indicated by the signal name to supply the waveform data to a different sub-network via the connecting network.

Conversely, setting, in the connecting node, of a signal name of one of the signals written into the TL frame in the connecting network as the signal name (in this case, the connecting network will be set as the supply source) and setting of a sub-network as the supply destination means setting to realize such a signal transport that the connecting node supplies the waveform data indicated by the signal name to the sub-network which the connecting node controls as the sub-network master so that the other devices belonging to the sub-network can read the waveform data.

The setting of the routing table as described above may be performed by operating the device itself which operates according to the routing table, and can also be performed by operating another device such as the consoles Ca1 and Cb1. In the latter case, the device which has detected the setting operation transmits a command for notifying of the setting operation to the device that is the target of the setting, and the device which receives this command updates its routing table according to the command.

Figure 19:
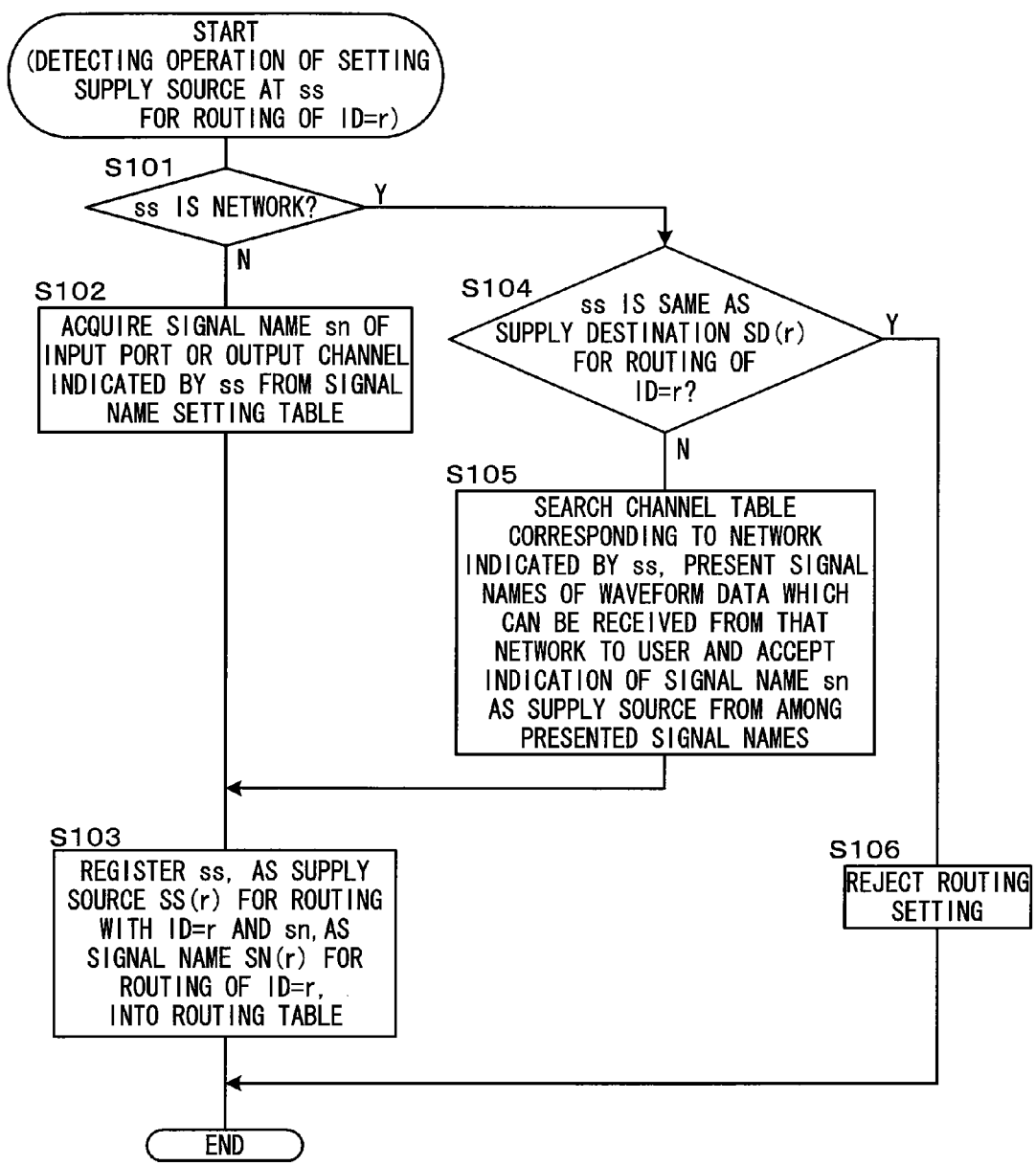
FIG. 19 is the flowchart of process executed by the devices constituting the audio network system S when the instruction to set the supply source is detected on the individual patch setting screen.
Figure 20:
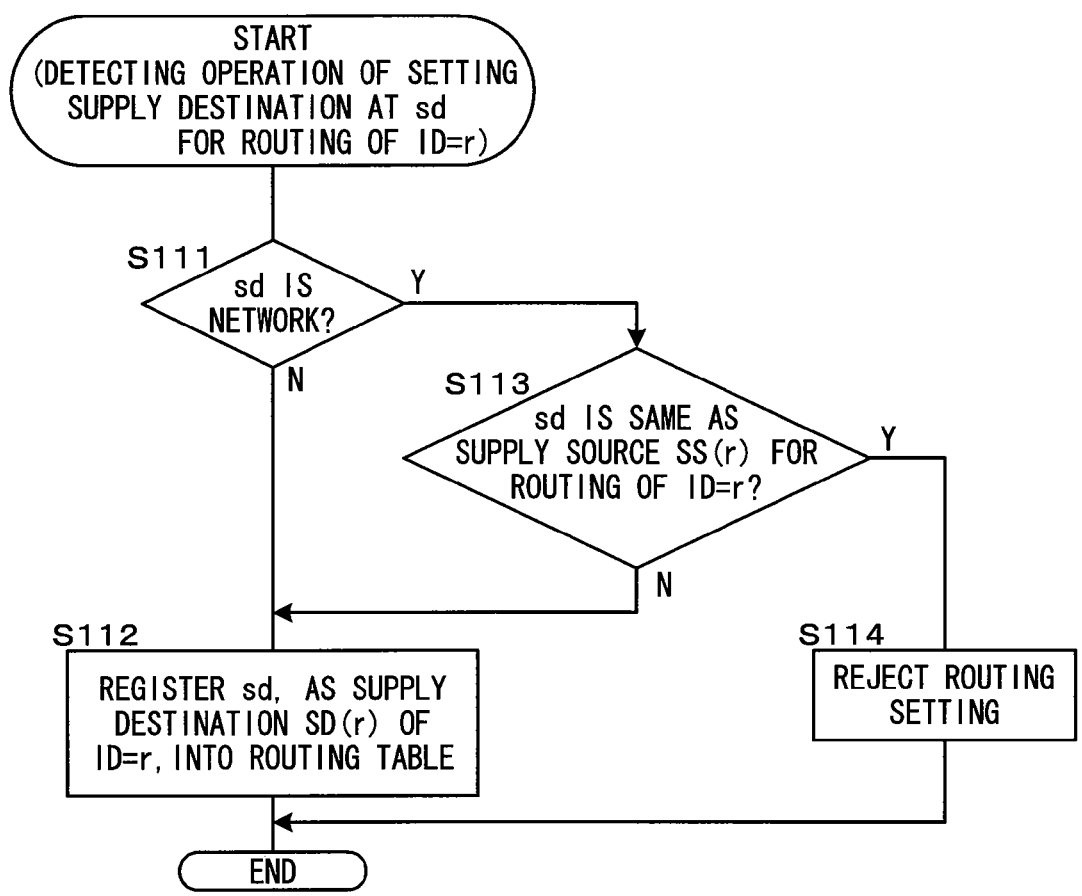
FIG. 20 is the flowchart of process executed by the same when the instruction to set the supply destination is detected on the individual patch setting screen.
Figure 21:
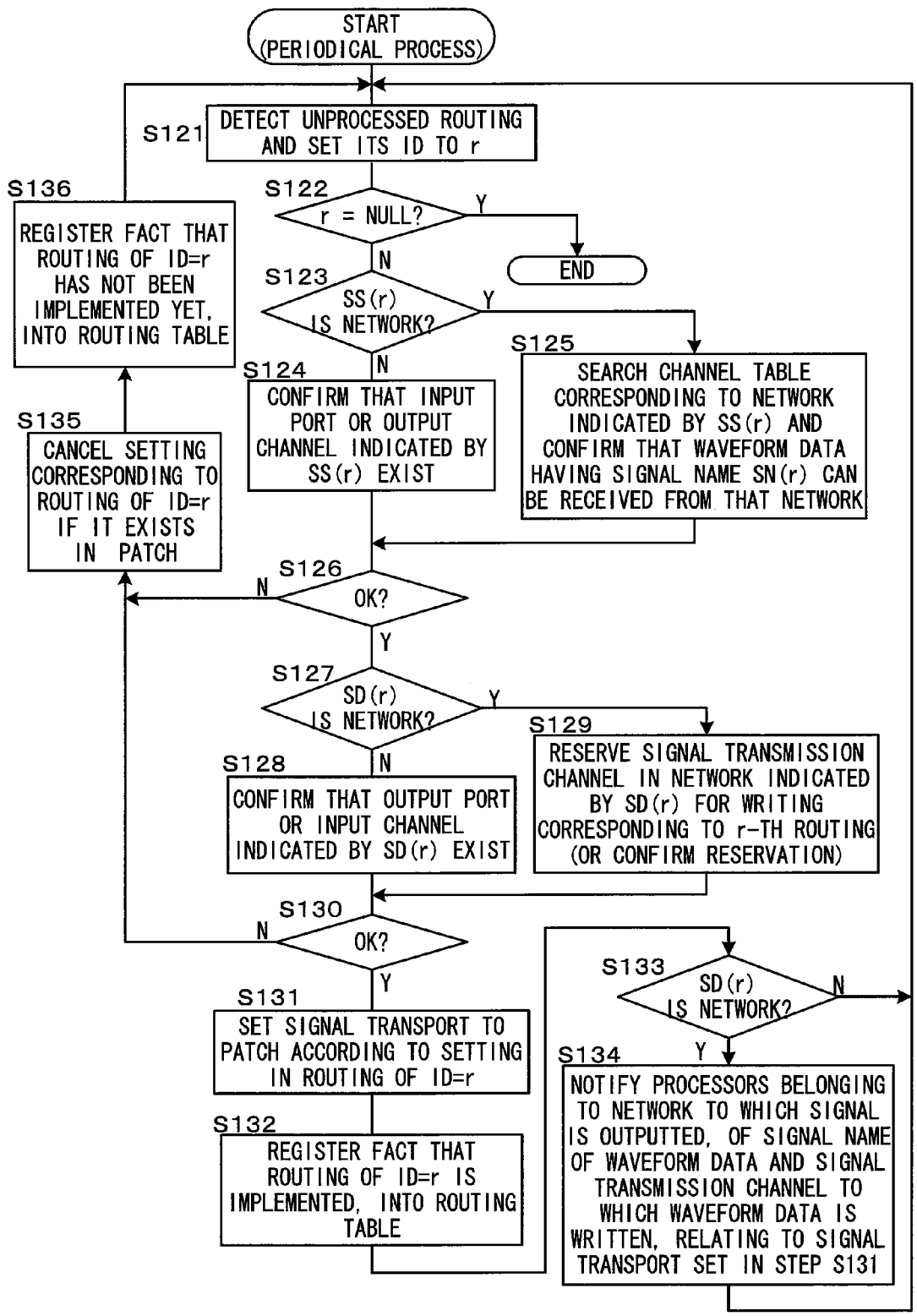
FIG. 21 is the flowchart of process executed by the same for reflecting the settings on the routing table in the operation of the processor.

Next, FIG. 19 to FIG. 21 show flowcharts of processes executed by the devices constituting the audio network system S for accepting the routing setting (individual patch setting) which has been described above and reflecting the status of the routing setting.

FIG. 19 shows the flowchart of process when the instruction to set the supply source has been detected on the individual patch setting screen.

Regardless whether or not the audio signal device 10 is in a state of constituting the audio network system S, the CPU 201 of the audio signal processor 10, which is capable of constituting the audio network system S, starts the process shown in FIG. 19 when detecting the operation of setting the supply source at ss for the routing of the ID=r of the audio signal device 10 (including the command for notifying of the setting operation).

When the ss is not a network (NO in S101), the ss is an input port or an output channel, and therefore the CPU 201 acquires a signal name sn corresponding to the input port or the output channel from the signal name setting table shown in FIG. 17 (S102).

Then, the CPU 201 registers the ss that the CPU 201 is instructed to set, as a supply source SS(r) for an r-th routing and the sn acquired in Step S102 as a signal name SN(r) of the same, into the routing table (S103), and end the process.

When the ss is a sub-network in Step S101, the CPU 201 confirms that the sub-network is not identical to a supply source SD(r) for the same routing (S104).

When they are not identical, the CPU 201 searches the channel table corresponding to the network indicated by the ss, and presents the signal names of the waveform data which can be received from the network to the user and accepts, from the user, an indication of a signal name sn as the supply source from among the presented signal names (S105). Then, the CPU 201 sets the ss and the sn into the routing table in Step S103 and ends the process.

When they are the identical in Step S104, the CPU 201 rejects the routing setting (S106), and ends the process. In this case, the CPU 201 preferably notifies the user of that rejection via message or the like. In the case of setting by a command from another device, it is necessary for the CPU 201 to merely send a response that the setting has been rejected.

Next, FIG. 20 shows the flowchart of process when the instruction to set the supply destination has been detected on the individual patch setting screen.

As in the case of FIG. 19, the CPU 201 of the audio signal processor 10 starts the process shown in the flowchart of FIG. 20 when detecting the operation of setting the supply destination at sd regarding the r-th routing of the audio signal processor 10.

When the sd is not a network (NO in S111), the sd is an output port or an input channel and there is no problem in setting as it is, and therefore the CPU 201 registers the sd as the supply destination SD(r) for the r-th routing into the routing table according to the instruction (S112), and end the process.

When the sd is a sub-network in Step S111, the CPU 201 confirms that the sub-network is not identical to the supply source SS(r) for the same routing (S113). When they are not identical, there is also no problem in setting the sd as it is, and therefore the CPU 201 performs this setting in Step S112, and end the process.

When they are identical in Step S113, the CPU 201 rejects the routing setting (S114), and ends the process. Also in this case, the CPU 201 preferably notifies the user of that rejection.

The processes shown in FIG. 19 and FIG. 20 enable each device to set the routing table according to the instruction by the user.

Next, FIG. 21 shows the flowchart of process for reflecting the status of the routing table in the operation of the device.

The CPU 201 of the audio signal processor 10, in the state where the audio signal processor constitutes the audio network system S, periodically executes the process shown in the flowchart of FIG. 21, and thereby reflects the status of the routing table stored in the audio signal processor, in the operations of reading and writing of the waveform data in the network I/F card 215 and transport of the waveform data in the audio bus 217. In this case, it is not necessary to distinguish the setting performed using the input patch setting screen and the output patch setting screen from the setting performed using the individual patch setting screen.

In the process in FIG. 21, the CPU 201 first searches the routing table shown in FIG. 18 to detect an unprocessed routing, and assigns the ID of the detected routing to r (S121). When r=null, namely, process for all of routings has been completed and any unprocessed routing is not found (S122), the CPU 201 just ends the process. If an unprocessed routing is found, the CPU 201 proceeds to the process in Step S123 and subsequent thereto in order to confirm whether the operation corresponding to the routing with ID=r is possible or not.

When the supply source SS(r) is not a network, the CPU 201 confirms that the input port or the output channel indicated by the SS(r) exists (S123, S124). When the SS(r) is a network, the CPU 201 searches the channel table corresponding to the network indicated by the SS(r), and confirms that the waveform data having the signal name SN(r) can be received from the network (S125).

When the CPU 201 can confirm the above (YES in S126), the CPU 201 proceeds to process of confirming the supply destination SD(r).

When the supply destination SD(r) is not a network, the CPU 201 confirms that the output port or the input channel indicated by the SD(r) exists (S127, S128). When the SD(r) is a network, the CPU 201 reserves a transmission channel in the network indicated by the SD(r) for writing corresponding to the routing with ID=r or confirms the reservation (S129).

When the CPU 201 can confirm the above (YES in S130), the CPU 201 recognizes that the routing with ID=r can be reflected in the operation of the audio signal processor 10, and therefore sets the signal transport according to the setting to an adequate patch (S131), and registers the fact that the routing is implemented, into the routing table (S132).

When the SD(r) is a network, the CPU 201 notifies the devices belonging to the network to which the signal is outputted, of the signal name of the waveform data and the transmission channel to which the waveform data is written, relating to the signal transport set in Step S131 (S133, S134).

Each of the devices receiving the notification in Step S134 reflects the information in the notification in the channel table shown in FIG. 22 by not-show process so that the device can grasp transmission channels from which waveform data can be received and the signal names of the waveform data in the network relating to the notification. This channel table is referred to in the processes in Step S105 in FIG. 19 and in Step S125 in FIG. 21.

When NO in Step 126 or S130 in FIG. 21, the CPU 201 recognizes that the signal transport according to the routing with ID=r cannot be performed, and therefore cancels the setting corresponding to the routing if it exists in a patch (S135), and registers the fact that the routing has not been implemented yet, into the routing table (S136).

In either case, the CPU 201 returns to Step S121 and repeats the process.

By the above processes, each device can reflect the status of the routing table in the operation of the device.

Accordingly, the audio network system S can initiate forwarding operation of, for example, an audio signal conveyed by the sub-network in the first sub-network system Sa to the sub-network in the second sub-network system Sb through following steps 1a) to 1d).

1a) The console Ca1 (a first controller that controls transmission of the audio signals in the first sub-network system Sa) selects one or more audio signals among audio signals which the first connecting node can receive via the sub-network in the first sub-network system Sa and sets, to the input/output device IOa1 which is the first connecting node, one or more signal names identifying the selected audio signals, as above described setting of the routing from the sub-network to the connecting network (see also step S105 in FIG. 19 and the channel table in FIG. 22).

1b) Based on the signal names set to the input/output device IOa1 in the step 1a), the input/output device IOa1 reserves one or more transmission channels among the plurality of transmission channels of the connecting network, sends the audio signals identified by the signal names via the connecting network using the reserved transmission channels, and notifies, to the input/output device IOb3 which is the second connecting node and the console Cb1 (a second controller that controls transmission of the audio signals in the second sub-network system Sb), the signal names related with the reserved transmission channels, as described referring to Steps S81 to S83 in FIG. 13. This step is to start signal transmission in the input/output device IOa1 according to the routing set in the step 1a) through the process described referring to FIG. 21. Especially, the above notification of the signal names is performed in Step S83 in FIG. 13 and Step S134 in FIG. 21.

1c) The console Cb1 selects an audio signal among the audio signals identified by the signal names, notified by the input/output device IOa1 in the step 1b), and sets, to the input/output device IOb3, the signal name identifying the selected audio signal, as above described setting of the routing from the connecting network to the sub-network (see also step S105 in FIG. 19 and the channel table in FIG. 22).

1d) Based on the signal name set to the input/output device IOb3 in the step 1c), the input/output device IOb3 receives the audio signal in the transmission channel related with the signal name via the connecting network, and sends the received audio signal via the sub-network in the second sub-network system, as described referring to Steps S93 and S94 in FIG. 13. This step is to start signal transmission in the input/output device IOb3 according to the routing set in the step 1c) through the process described referring to FIG. 21.

Alternatively, the audio network system S can initiate the above forwarding operation through following steps 2a) to 2f).

2a) The console Ca1 selects one or more audio signals among audio signals identified by signal names notified by any node in the first sub-network system Sa and sets, to the input/output device IOa1, one or more signal names identifying the selected audio signals, as above described setting of the routing from the sub-network to the connecting network (see also step S105 in FIG. 19 and the channel table in FIG. 22). Note that each of the nodes in the first sub-network system Sa notifies the devices belonging to the first sub-network system Sa of the signal name of the audio signal the node transmits to the first sub-network in step S134 in FIG. 21.

2b) Based on the signal names set to the input/output device IOa1 in the step 2a), the input/output device IOa1 receives one or more audio signals in one or more transmission channels related with the signal names via the sub-network in the first sub-network system Sa. This step corresponds to the above described step 1b), but for only the operations for receiving signals.

2c) The input/output device IOa1 reserves one or more transmission channels of the connecting network, sends the audio signals received in the step 2b) via the connecting network using the reserved transmission channels, and notifies, to the input/output device IOb3 and the console Cb1, the signal names set to the input/output device IOa1 in the step 2a) related with the reserved transmission channels. This step corresponds to the above described step 1b), but for only the operations for transmitting signals.

2d) The console Cb1 selects an audio signal among the audio signals identified by the signal names, notified by the input/output device IOa1 in the step 2c), and sets, to the input/output device IOb3, the signal name identifying the selected audio signal. This step corresponds to the above described step 1c).

2e) Based on the signal name set to the input/output device IOb3 in the step 2d), the input/output device IOb3 receives the audio signal in the transmission channel related with the signal name via the connecting network. This step corresponds to the above described step 1d), but for only the operations for receiving signals.

2f) the input/output device IOb3 reserves a transmission channel of the sub-network in the second sub-network system Sb, sends the audio signal received in the step 2e) via the second sub-network in the second sub-network system Sb using the reserved transmission channel, and notifies the signal name set to the input/output device IOb3 in the step 2d) and related with the reserved transmission channel to each of the nodes in the second sub-network system and the console Cb1. This step corresponds to the above described step 1d), but for only the operations for transmitting signals. Note that each of the nodes in the second sub-network system Sb including the input/output device IOb3 notifies the devices belonging to the second sub-network system Sb of the signal name of the waveform data the node transmits to the second sub-network in step S134 in FIG. 21.

Further, the audio network system S can initiate a receiving operation of an audio signal via the sub-network by one node in the second sub-network system Sb through following steps g) to h).

g) The console Cb1 selects an audio signal among audio signals identified by signal names notified by any node in the second sub-network system Sb and sets, to the one node, a signal name identifying the selected audio signal, as above described setting of the routing from the sub-network to the output port or the input channel (see also step S105 in FIG. 19 and the channel table in FIG. 22). Note that the input/output device IOb3 in the second sub-network system Sb notifies the one node in the same second sub-network system Sb of the signal name of the audio signals which have been conveyed by the connecting network from the first sub-network system Sa and transmitted to the second sub-network system Sb by the input/output device IOb3. Accordingly, such audio signals transported across the connecting node can be selected in the same manner as the case of selecting audio signals transported from another node in the same second sub-network system Sb.

h) Based on the signal names set to the one node in the step g), the one node receives an audio signal in a transmission channel related with the signal name via the second sub-network in the second sub-network system Sb. This step is to start signal transmission in the one node according to the routing set in the step g) through the process described referring to FIG. 21.

Further, the audio network system S can initiate a transmitting operation of an audio signal via the sub-network by one node in the first sub-network system Sa through following steps i) to k).

i) The console Ca1 gives a signal name to each of audio signals input to the one node or processed in the one node and notifies the signal names of the audio signals to the one node, as explained with reference to FIG. 17.

j) The console Ca1 selects an audio signal among the audio signals in the one node and commands the one node to send the selected audio signals, as above described setting of the routing from the input port or the output channel to the sub-network (see also step S102 in FIG. 19).

k) Based on the command in the step j), the one node reserves a transmission channel of the first sub-network in the first sub-network system Sa, sends the audio signal selected in the step j) via the first sub-network in the first sub-network system Sa using the reserved transmission channel, and notifies the signal name of the selected audio signal related with the reserved transmission channel to each of the nodes and the console Ca1 in the first sub-network system Sa. This step is to start signal transmission in the one node according to the routing set in the step j) through the process described referring to FIG. 21. Especially, the above notification of the signal names is performed in Step S134 in FIG. 21.

Furthermore, according to the routing setting method as described above, settings on the signal transmission from the sub-network to the connecting network and the settings on the signal capture from the connecting network into the sub-network can be independently performed. Therefore, the settings can be performed in each sub-network without concerning about the status of the setting in the other sub-network, and the status of the routing setting can be reflected in the actual signal transport by simple process.

Even when an audio signal in one channel outputted to the network by a device is captured by many devices in a different network for use of sound generation, it is necessary to perform setting of signal transport to another sub-network not for each combination of the output side and the capture side but only for one channel on the output side (it is only necessary to perform, on the capture side, setting of capturing the audio signals conveyed by the connecting network). Accordingly, a part of signal transport routes can be easily shared for a plurality of combinations of the output side and the capture side of audio.

Such setting method has high affinity for the configuration of each sub-networks described in the above embodiment which can write waveform data into the TL frame and transmit the TL frame into the network without concerning about which device and how many devices actually read(s) the waveform data.

4. About Remote Control

Next, the operations of devices performed when a device constituting the audio network system S is remotely controlled from another device will be described.

In the audio network system S, a unique network ID is given to each sub-network system as has been described. In addition, the consoles Ca1 and Cb1 that is a controller that remotely controls a device constituting the audio network system S is configured to limit the control target to one sub-network by designating the network ID to enable remote control only for the devices belonging to the sub-network system designated by the network ID, that means, the respective remote controllers can remote control transmission of the audio signals in only one of the sub-network systems.

Incidentally, it is not always necessary that the sub-network which the console belongs to is the same as the sub-network that is the control target, and it is also adoptable to manually change the sub-network to be a control target.

The remote control referred to here includes setting of signal name and routing as well as setting of parameters defining the signal processing to be performed such as level adjustment and signal ON/OFF.

FIG. 23 shows the flowchart of process executed by the controller when detecting the remote control operation.

When the CPU 201 of the audio signal processor 10 working as the controller detects that the operated control 206 to remotely control another device, the CPU 201 starts the process shown in the flowchart of FIG. 23.

The CPU 201 first identifies the target device of the remote control relating to the detected operation (S141). The target device can be identified based on the state of the audio signal processor 10 regarding for which device the audio signal processor 10 is accepting the setting operation. In many cases, it is conceivable that when the CPU 201 recognizes that the operation by the user relates to the remote control, the CPU 201 can recognize also the device for which the remote control operation is performed.

The CPU 201 then updates the current memory in the controller according to the detected operation (S142). The audio signal processor 10 working as the controller prepares the current memory corresponding to the respective devices to store the same data as those in the current memories (including the signal name setting table and the routing table) in all of the devices that will be the target of the remote control in order to improve the response of display relating to the remote control. The audio signal processor 10 also synchronizes with the target device regarding the data of its current memory and updates the current memory of the audio signal processor 10 itself according to the remote control operation, to display the result of the update before notifying the target device of the operation.

The CPU 201 then generates a control operation notification including the information of the detected control operation and the network ID of the sub-network system that is set as the control target at present, addressed to the target device identified in Step S141, and transmits the control operation notification by writing the notification into the TL frame in the sub-network which the audio signal processor 10 belongs to (S143). This notification is generated here as the Ethernet frame and written into the Ethernet frame region 106 for transmission. The address of the control operation notification can be designated by the IP address and the device ID, and so on, but it is not necessary that those data are unique in the audio network system S as long as the data are unique in the sub-network.

After Step S143, the CPU 201 waits for the response to the transmitted control operation notification, and determines or cancels the update of the current memory in Step S142 according to the response (S144), and ends the process.

Figure 24:
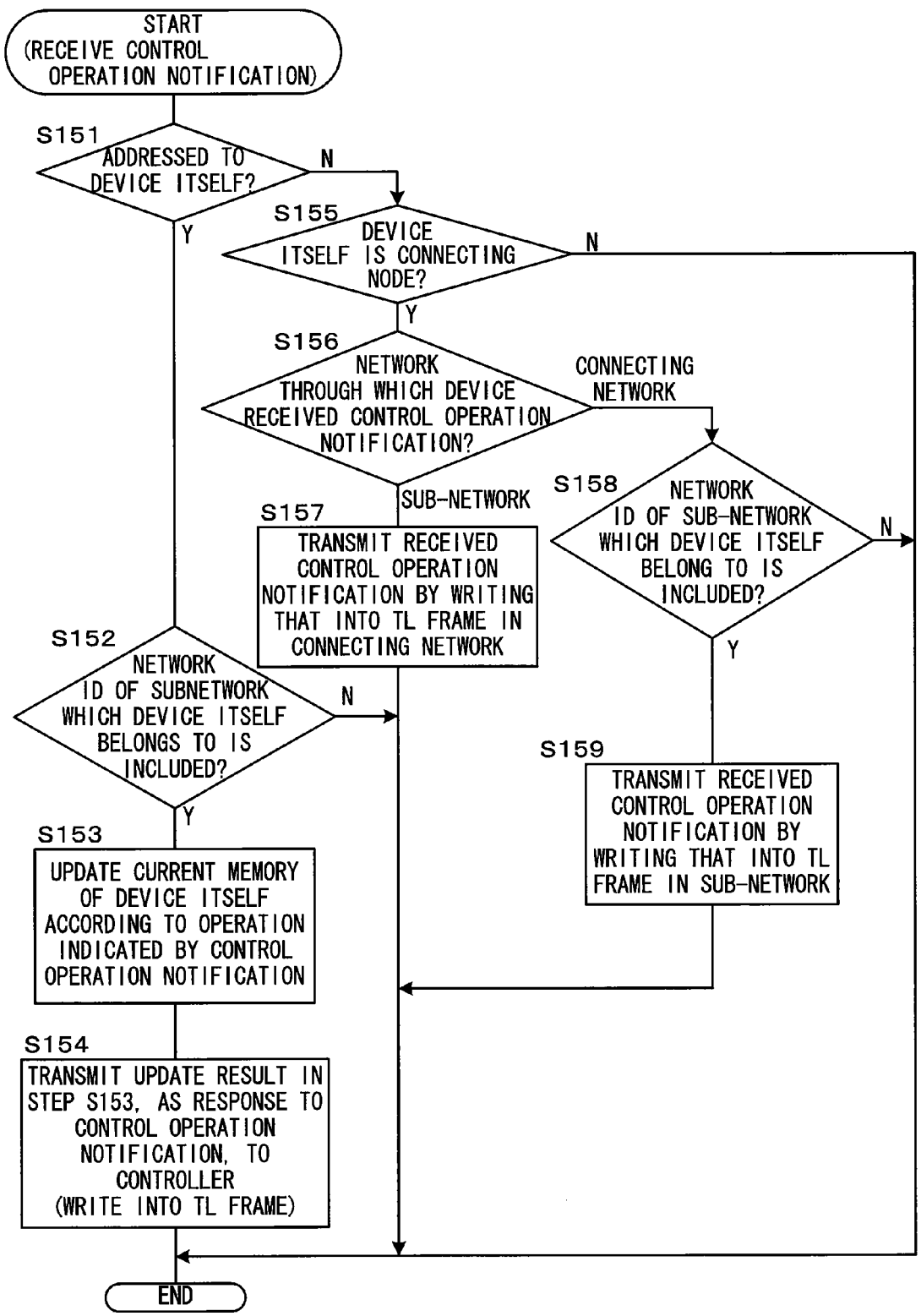
FIG. 24 is the flowchart of process executed by the device when receiving the remote control notification.

FIG. 24 shows the flowchart of process executed by the device when receiving the control operation notification.

Each of the devices constituting the audio network system S reads all the data written in the Ethernet frame region 106 in the received TL frame irrespective of the address of the frame written therein, and discards the read data if unnecessary. Accordingly, the control operation notification transmitted by the controller in Step S143 in FIG. 23 is received by at least all of the devices belonging to the same sub-network as that of the controller.

The CPU 201 of the device which receives the control operation notification starts the process shown in the flowchart of FIG. 24.

In this process, the CPU 201 confirms the address of the control operation notification (S151), and when it is addressed to the device itself, the CPU 201 confirms whether or not the network ID of the sub-network system which the device itself belongs to is included in the control operation notification (S152).

When the network ID is included, the CPU 201 thus judges that the received control operation notification is the one indicating the operation of the remote control for the device itself, and updates the current memory of the device itself according to the operation indicated by the notification (S153). When the operation indicates the instruction to update the signal name setting table or the routing table, the CPU 201 updates the tables.

The CPU 201 then transmits the update result in Step S153, as the response to the control operation notification, to the controller that is the transmission source of the control operation notification (S154), and ends the process.

When the network ID is different in Step S152, the CPU 201 judges that the received control operation notification is not the one indicating the operation of the remote control for the device itself, and just ends the process.

On the other hand, when the control operation notification is not addressed to the device itself in Step S151, the CPU 201 also judges that the received control operation notification is not the one indicating the operation of the remote control for the device itself, and just ends the process unless the device is the connecting node (NO in S155).

However, when the device itself is the connecting node, the CPU 201 perform process for transfer to the other sub-network when necessary. More specifically, when the network through which the device received the control operation notification is a sub-network (S156), the CPU 201 transmits the received control operation notification by writing the notification into the TL frame in the connecting network to transfer the notification to the other sub-network via the connecting network (S157), and ends the process.

When the network through which the device received the control operation notification is the connecting network (S156), the CPU 201 confirms whether or not the network ID of the sub-network system which the device itself belongs to is included in the control operation notification (S158). When the network ID is included, the CPU 201 judges that the received control operation notification should be received by a device belonging to the same sub-network as that of the device itself, and transmits the detected control operation notification to the sub-network by writing the notification into the TL frame in the sub-network (S159), and ends the process.

Note that when the connecting node executes the process in Step S159, the control operation notification arrives also at the sub-network different from the sub-network which the controller of the transmission source belongs to, and the CPU 201 of the device which receives the control operation notification will also start the process shown in the flowchart of FIG. 24.

The processes in FIG. 23 and FIG. 24 can limit the range of remote control by one controller to the range in one sub-network constituted in one sub-network system to easily confirm the control range from the status of physical connection. Besides, it is also possible to control the devices in the sub-network different from the sub-network which the controller belongs to by changing the ID of the sub-network system indicating the control target, thereby obtaining high degree of freedom for the selection of the control target.

For example, it is possible, when using the audio network system S in a live concert, to locate the input/output devices IOb1 to IOb3, the console Cb1 and the mixer engine Eb1 included in the second sub-network system Sb (in which the second sub-network is constituted) at a wing of the stage so as to use the mixer system MSb as the monitoring mixer for mixing monitor sound to be fed back to the player, and to locate the console Ca1, the mixer engine Ea1 and the input/output device IOa1 included in the first sub-network system Sa (in which first sub-network is constituted) among seats of audience so as to use the mixer system MSa as the FoH (Front of House) mixer for mixing main sound to be released to the audience. Further, it is also possible to connect the third sub-network system Sc (in which third sub-network system is constituted: not shown) to the connecting network so as to use the mixer system MSc (not shown) mainly including the mixer engine belonging to the third sub-network system Sc, as the mixer for live recording or live broadcasting.

As described above, when the audio network system S operates as a complex composed of mixer systems for different usages, separation of the control targets using the IDs of the sub-networks is effective.

Note that in the case where a plurality of controllers exist in the audio network system S, when the audio network system S is configured such that the plurality of controllers can remotely control one device, the control process possibly becomes confused. Therefore, the configuration made such that the control targets can be separated on a sub-network system basis is effective also in prevention of the above confusion. Accordingly, it is preferable to prevent the plurality of controllers from setting the same ID as the ID of the sub-network system of the control target.

5. Modifications

The explanation of the embodiment comes to an end, and it is of course that the configuration of device, the configuration of data, the employed communication protocol, the sampling period, concrete process steps, and so on are not limited to those in the above-described embodiment.

For example, the above embodiment has described that the connecting node requires a plurality of network I/F cards and therefore is different from other nodes in requirements on hardware. However, it is conceivable that a network I/F card is added to an appropriate node in the system so that the node is made to function as the connecting node, as long as the node has the specification capable of ejecting and inserting the card from/to it during power ON.

Conversely, it may be adoptable to enable to set in advance whether each network I/F card is used for the connection to the connecting network or for the connection to the sub-network. This configuration enables to hold the setting relating to each network while associating the setting with the hardware of the network I/F card, resulting in easier management of the settings.

Further, it is not essential that the I/F for connecting to the audio network system and the DSP for signal processing are formed in a card shape so that the I/F is attachable and detachable to/from the main body of the audio signal processor 10.

Further, the example in which the signal name of the waveform data transmitted in Step S134 in FIG. 21 is sent and the signal name is registered also in the channel table shown in FIG. 22 has been described in the above embodiment. In addition to the above, the network ID of the sub-network system which the signal supply source device (the device having the input port or the output channel that is the origin of the waveform data) belongs to may also be sent and registered into the channel table.

This configuration makes it possible for the user to select a signal to be captured referring also to the network ID in the signal selection when setting the routing, leading to easier signal selection.

Under such a configuration, the second controller selects an audio signal among the audio signals identified by the network ID and the signal names notified to the second connecting node, and sets, to the second connecting node, the network ID and the signal name identifying the selected audio signal, and the second connecting node receives the audio signal in the transmission channel related with the network ID and the signal name via the connecting network.

Conversely, it is also conceivable not to use the parameter of the "signal name" but to automatically generate a name identifying the origin of the waveform data of each channel, from the ID of the signal supply source device, the network ID of the sub-network system which the device belongs to, the ID of the input port or the output channel that is the supply source of the waveform data or the like, so as for the user to select the waveform data based on the generated name.

Further, the proper use of the TL frames circulated along the two transmission routes when the sub-networks and the connecting network are formed in the loop style and the relation between the proper use and the bridge operation have not been described in detail in the above-described embodiment, and these points are supplemented here.

The case where the TL frames are circulated along the two transmission routes in the network respectively includes a case where one of the TL frames is used to convey the waveform data of the transmission channels corresponding to one TL frame, and a case where both of the TL frames are used to convey the waveform data regarding the TL frames as including different transmission channels.

The former case has the advantage that even if a break of wire occurs at one location in the network, the network can be immediately switched to the operation in the cascade style to continue to convey the waveform data of the same number of channels as before. The latter case has the advantage that transmission channels twice that of the former case are available.

In the latter case here, when a break of wire occurs at one location in the network and the network is switched to the operation in the cascade connection, the number of available transmission channels decreases by half, thus there may be a situation that the network cannot convey any longer the waveform data the network could convey till then. In this case, the allocation of the transmission channels and so on will be reconsidered to reflect the routing set in each device in the operation of each device within the number of transmission channels provided by the cascade style system, by the routing update process shown in FIG. 21.

Note that the number of transmission channels may be different in each of the sub-networks and the connecting network in the audio network system S. Therefore, the decrease in the number of transmission channels in one network never affects the number of transmission channels in the other network. However, there may be a change accompanying the above-described reconsideration of the routing, that some network cannot receive any longer the waveform data that the network could receive from another network till then.

It is also conceivable to locate the controller described using FIG. 23 and FIG. 24 outside the sub-network system. Even in such configuration, a particular device belonging to the sub-network system is connected to the controller to be communicable with each other, the controller and the particular device performs tunneling operation by wrapping the control operation notification transmitted from the controller with the protocol permitted to be bridged by the connecting node (the processes in Steps S156 to S159 in FIG. 24) when transmitting the notification to the particular device and transmitting the wrapped notification into the sub-network constituted in the sub-network system, thereby enabling the same operation as in the case where the controller exists in the sub-network system.

Conversely, even in the case where the controller belongs to the sub-network system, the separation of the control for each sub-network can be implemented even without giving the network ID to the control operation notification, by preventing the connecting node from bridging the control operation notification.

Even when three or more sub-networks are connected by the connecting network, the bridge of the waveform data and the control data can be implemented by the process similar to that of the above-described embodiment.

The above-described modifications and the modifications described in the explanation of the embodiment are applicable in any combination in a range without contradiction. Inversely, it is not always necessary for the network system and the audio signal processor to have all of the features which have been described in the explanation of the embodiment.

As is clear from the above description, the network system of the invention makes it possible to connect a plurality of networks each conveying audio signals by periodically circulating a frame along a ring transmission route, to thereby implement audio signal transport across the systems by a simple operation and control.

Accordingly, application of the invention can improve the convenience of the network system.

What is claimed is:

1. A network system comprising:
 a first sub-network system including a first plurality of nodes connected to one another in a cascade style or in a loop style to constitute a first sub-network conveying a plurality of audio signals among said first plurality of nodes;
 a second sub-network system including a second plurality of nodes connected to one another in a cascade style or in a loop style to constitute a second sub-network conveying a plurality of audio signals among said second plurality of nodes;
 a first connecting node in said first sub-network system and a second connecting node in said second sub-network system connected to each other to constitute a connecting network conveying a plurality of audio signals, using a plurality of transmission channels, among said first connecting node and said second connecting node;
 a first controller that controls transmission of the audio signals in said first sub-network system; and
 a second controller that controls transmission of the audio signals in said second sub-network system,
 wherein said first controller selects one or more audio signals among audio signals in said first sub-network in said first sub-network system and sets, to said first connecting node, one or more signal names identifying the selected one or more audio signals;
 wherein, based on the one or more signal names set to said first connecting node, said first connecting node reserves one or more transmission channels among said plurality of transmission channels of said connecting network, sends the one or more audio signals identified by the one or more signal names via said connecting network using the reserved one or more transmission channels, and notifies, to said second connecting node and said second controller, the one or more signal names related with the reserved one or more transmission channels;
 wherein said second controller selects an audio signal among the one or more audio signals identified by the one or more signal names, notified by said first connecting node, and sets, to said second connecting node, the signal name identifying the selected audio signal; and
 wherein, based on the signal name set to said second connecting node, said second connecting node receives the audio signal in the transmission channel related with the signal name via said connecting network, and sends the received audio signal via said second sub-network in said second sub-network system.

2. The network system according to claim 1,
 wherein each of said first and second sub-network systems has its network ID,
 wherein said first connecting node notifies, to said second connecting node, the network ID of said first sub-network system in addition to the one or more signal names related with the reserved one or more transmission channels,
 wherein said second controller selects an audio signal among the one or more audio signals identified by the network ID and the one or more signal names notified to said second connecting node, and sets, to said second connecting node, the network ID and the signal name identifying the selected audio signal, and wherein based on the network ID and the signal name set to said second connecting node said second connecting node receives the audio signal in the transmission channel related with the network ID and the signal name via said connecting network.

3. The network system according to claim 1, wherein a ring transmission route running through said first connecting node and said second connecting node is formed for said connecting network and a frame having said plurality of transmission channels is periodically circulating along said ring transmission route, one of said first and second connecting nodes transmits an audio signal by writing the audio signal into one transmission channel in the frame and the other of said first and second connecting nodes receives the audio signal by reading the audio signal from the transmission channel in the frame.

4. A network system comprising:

a first sub-network system including a first plurality of nodes connected to one another in a cascade style or in a loop style to constitute a first sub-network conveying a plurality of audio signals, using a plurality of transmission channels, among said first plurality of nodes;

a second sub-network system including a second plurality of nodes connected to one another in a cascade style or in a loop style to constitute a second sub-network conveying a plurality of audio signals, using a plurality of transmission channels, among said second plurality of nodes;

a first connecting node in said first sub-network system and a second connecting node in said second sub-network system connected to each other to constitute a connecting network conveying a plurality of audio signals, using a plurality of transmission channels, among said first connecting node and said second connecting node;

a first controller that controls transmission of the audio signals in said first sub-network system; and a second controller that controls transmission of the audio signals in said second sub-network system, wherein each node in said first sub-network system reserves one or more transmission channels of said first sub-network in said first sub-network system, transmits one or more audio signals in the node via said first sub-network in said first sub-network system using the reserved one or more transmission channels, and notifies one or more signal names identifying the transmitted one or more audio signals and related with the reserved one or more transmission channels to each of the nodes in said first sub-network system and said first controller;

wherein said first controller selects one or more audio signals among audio signals identified by signal names notified by a node in said first sub-network system and sets, to said first connecting node, one or more signal names identifying the selected one or more audio signals;

wherein, based on the one or more signal names set to said first connecting node, said first connecting node receives one or more audio signals in one or more transmission channels related with the one or more signal names via said first sub-network in said first sub-network system;

wherein said first connecting node reserves one or more transmission channels of said connecting network, sends the one or more audio signals received by said first connecting node via said connecting network using the reserved one or more transmission channels, and notifies, to said second connecting node and said second controller, the one or more signal names set to said first connecting node related with the reserved one or more transmission channels;

wherein said second controller selects an audio signal among the one or more audio signals identified by the one or more signal names, notified by said first connecting node, and sets, to said second connecting node, the signal name identifying said selected audio signal;

wherein, based on the signal name set to said second connecting node, said second connecting node receives the audio signal in the transmission channel related with the signal name via said connecting network; and wherein said second connecting node reserves a transmission channel of said second sub-network in said second sub-network system, sends the audio signal received by said second connecting node via said second sub-network in said second sub-network system using the reserved transmission channel, and notifies the signal name set to said second connecting node and related with the reserved transmission channel to each of the nodes in said second sub-network system and said second controller.

5. The network system according to claim 4, wherein each of said first and second sub-network systems has its network ID, wherein said first connecting node notifies, to said second connecting node and said second controller, the network ID of said first sub-network system in addition to the one or more signal names related with the reserved one or more transmission channels, wherein said second controller selects an audio signal among the one or more audio signals identified by the network ID and the one or more signal names notified by said first connecting node, and sets, to said second connecting node, the network ID and the signal name identifying the selected audio signal, and wherein based on the network ID and the signal name set to said second connecting node, said second connecting node receives the audio signal in the transmission channel related with the network ID and the signal name via said connecting network.

6. The network system according to claim 4, wherein, in each of said first and second sub-network systems, a ring transmission route running through all of said plurality of nodes is formed, and a frame having a plurality of transmission channels is periodically circulating along said ring transmission route, said sub-network conveys an audio signal from one node to an other node in such a way that said one node transmits an audio signal via said sub-network by writing the audio signal into one transmission channel in the circulating frame and said other node receives the audio signal via said sub-network by reading the audio signal from the transmission channel in the circulating frame.

7. The network system according to claim 4, wherein said second controller selects an audio signal among audio signals identified by signal names notified by a node in said second sub-network system and sets, to one node in said second sub-network system, a signal name identifying the selected audio signal; and wherein, based on the signal name set to said one node, said one node receives an audio signal in a transmission channel related with the signal name via said second sub-network in said second sub-network system.

8. The network system according to claim 4,
wherein said first controller selects an audio signal among audio signals identified by signal names notified by a node in said first sub-network system and sets, to one node in said first sub-network system, a signal name identifying the selected audio signal; and
wherein, based on the signal name set to said one node, said one node receives an audio signal in a transmission channel related with the signal name via said first sub-network in said first sub-network system.

9. The network system according to claim 4,
wherein said first controller gives a signal name to each of audio signals input to one node in said first sub-network system or processed in the one node and notifies the signal names of said audio signals to the one node;
wherein said first controller selects an audio signal among said audio signals in the one node and commands said one node to send the selected audio signal by a command; and
wherein, based on the command, said one node reserves a transmission channel of said first sub-network in said first sub-network system, sends the audio signal selected by said first controller via said first sub-network in said first sub-network system using the reserved transmission channel, and notifies the signal name of the selected audio signal related with the reserved transmission channel to each of the nodes in said first sub-network system and said first controller.

10. The network system according to claim 4,
wherein said second controller gives a signal name to each of audio signals input to one node in said second sub-network or processed in the one node and notifies the signal names of said audio signals to the one node;
wherein said second controller selects an audio signal among said audio signals in the one node and commands said one node to send the selected audio signal by a command; and
wherein based on the command, said one node reserves a transmission channel of said second sub-network in said second sub-network system, sends the audio signal selected by said second controller via said second sub-network in said second sub-network system using the reserved transmission channel, and notifies the signal name of the selected audio signal related with the reserved transmission channel to each of the nodes in said second sub-network system and said second controller.

11. A method for a network system, the network system comprising a first sub-network system including a first plurality of nodes connected to one another in a cascade style or in a loop style to constitute a first sub-network conveying a plurality of audio signals among said first plurality of nodes; a second sub-network system including a second plurality of nodes connected to one another in a cascade style or in a loop style to constitute a second sub-network conveying a plurality of audio signals among said second plurality of nodes; a first connecting node in said first sub-network system and a second connecting node in said second sub-network system connected to each other to constitute a connecting network conveying a plurality of audio signals, using a plurality of transmission channels, among said first connecting node and said second connecting node; a first controller that controls transmission of the audio signals in said first sub-network system; and a second controller that controls transmission of the audio signals in said second sub-network system; the method comprising:
initiating a forwarding operation of an audio signal conveyed by said first sub-network in said first sub-network system to said second sub-network in said second sub-network system through performing steps a) to d):
a) performing by said first controller: selecting one or more audio signals among audio signals in said first sub-network in said first sub-network system and setting, to said first connecting node, one or more signal names identifying the selected audio signals;
b) performing by said first connecting node: based on the one or more signal names set to said first connecting node in said step a), reserving one or more transmission channels among said plurality of transmission channels of said connecting network, sending the one or more audio signals identified by the one or more signal names via said connecting network using the reserved one or more transmission channels, and notifying, to said second connecting node and said second controller, the one or more signal names related with the one or more reserved transmission channels;
c) performing by said second controller: selecting an audio signal among the one or more audio signals identified by the one or more signal names, notified by said first connecting node in said step b), and setting, to said second connecting node, the signal name identifying the selected audio signal; and
d) performing by said second connecting node: based on the signal name set to said second connecting node in said step c), receiving the audio signal in the transmission channel related with the signal name via said connecting network, and sending the received audio signal via said second sub-network in said second sub-network system.

12. A method for a network system, the network system comprising a first sub-network system including a first plurality of nodes connected to one another in a cascade style or in a loop style to constitute a first sub-network conveying a plurality of audio signals, using a plurality of transmission channels, among said first plurality of nodes; a second sub-network system including a second plurality of nodes connected to one another in a cascade style or in a loop style to constitute the second sub-network conveying a plurality of audio signals, using a plurality of transmission channels, among said second plurality of nodes; a first connecting node in said first sub-network system and a second connecting node in said second sub-network system connected to each other to constitute a connecting network conveying a plurality of audio signals, using a plurality of transmission channels, among said first connecting node and said second connecting node; a first controller that controls transmission of the audio signals in said first sub-network system; and a second controller that controls transmission of the audio signals in said second sub-network system, wherein each node in said first sub-network system reserves one or more transmission channels of said first sub-network in said first sub-network system, transmits one or more audio signals in the node via said first sub-network in said first sub-network system using the reserved one or more transmission channels, and notifies one or more signal names identifying the transmitted one or more audio signals and related with the reserved one or more transmission channels to each of the nodes in said first sub-network system and said first controller; the method comprising;
initiating a forwarding operation of an audio signal conveyed by said first sub-network in said first sub-network system to said second sub-network in said second sub-network system through performing steps a) to f):

a) performing by said first controller: selecting one or more audio signals among audio signals identified by signal names notified by a node in said first sub-network system and setting, to said first connecting node, one or more signal names identifying the selected one or more audio signals;

b) performing by said first connecting device: based on the one or more signal names set to said first connecting node in said step a), receiving one or more audio signals in one or more transmission channels related with the one or more signal names via said first sub-network in said first sub-network system;

c) performing by said first connecting node: reserving one or more transmission channels of said connecting network, sending the one or more audio signals received in said step b) via said connecting network using the reserved one or more transmission channels, and notifying, to said second connecting node and said second controller, the one or more signal names set to said first connecting node in said step a) related with the reserved one or more transmission channels;

d) performing by said second controller: selecting an audio signal among the one or more audio signals identified by the one or more signal names, notified by said first connecting node in said step c), and setting, to said second connecting node, the signal name identifying said selected audio signal;

e) performing by said second connecting node: based on the signal name set to said second connecting node in said step d), receiving the audio signal in the transmission channel related with the signal name via said connecting network; and f) performing by said second connecting node: reserving a transmission channel of said second sub-network in said second sub-network system, sending the audio signal received in said step e) via said second sub-network in said second sub-network system using the reserved transmission channel, and notifying the signal name set to said second connecting node in said step d) and related with the reserved transmission channel to each of the nodes in said second sub-network system and said second controller.

\* \* \* \* \*